US009661666B2

(12) United States Patent
Ahmavaara

(10) Patent No.: US 9,661,666 B2
(45) Date of Patent: May 23, 2017

(54) APPARATUS AND METHODS OF IDENTITY MANAGEMENT IN A MULTI-NETWORK SYSTEM

(71) Applicant: QUALCOMM Incorporated, San Diego, CA (US)

(72) Inventor: Kalle Ilmari Ahmavaara, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/921,822

(22) Filed: Oct. 23, 2015

(65) Prior Publication Data

US 2016/0050697 A1      Feb. 18, 2016

Related U.S. Application Data

(62) Division of application No. 13/493,974, filed on Jun. 11, 2012, now Pat. No. 9,198,038.

(Continued)

(51) Int. Cl.
*G06F 15/177*    (2006.01)
*H04W 76/02*    (2009.01)
(Continued)

(52) U.S. Cl.
CPC ......... *H04W 76/021* (2013.01); *H04L 61/106* (2013.01); *H04L 61/1588* (2013.01);
(Continued)

(58) Field of Classification Search
CPC .......... H04L 63/0815; H04L 61/1588; H04W 76/021; H04W 4/001; H04W 12/06; G06F 15/173
(Continued)

(56) References Cited

U.S. PATENT DOCUMENTS 7,818,294 B2    10/2010    Fung et al.
8,661,103 B2    2/2014    Mehta et al.
(Continued)

FOREIGN PATENT DOCUMENTS

JP    2008524880 A    7/2008
JP    2010531005 A    9/2010
(Continued)

OTHER PUBLICATIONS

"3rd Generation Partnership Project; Technical Specification Group Core Network and Terminals; Policy and Charging Control over Gx/Sd reference point (Release 11)", 3GPP Standard; 3GPP TS 29.212, 3rd Generation Partnership Project (3GPP), Mobile Competence Centre; 650, Route Des Lucioles; F-06921 Sophia-Antipolis Cedex; France, vol. CT WG3, No. V11.1.0, Jun. 10, 2011 (Jun. 10, 2011), pp. 1-152, XP050552953, [retrieved on Jun. 10, 2011] paragraphs [04.4], [4.5.2.1], [05.6]-[5.6.3].

(Continued)

*Primary Examiner* — Tauqir Hussain
(74) *Attorney, Agent, or Firm* — Won Tae C. Kim

(57) ABSTRACT

Apparatus and methods of communication include receiving, at a device, a device-specific identifier and a credential associated with an issuing identity provider, wherein an identity of the device is capable of authentication by the identity provider based on the device-specific identifier and the credential. Further, the aspects include storing the device-specific identifier and the credential in a secure environment on the device. Additionally, the device-specific identifier is capable of being associated with different subscriber service accounts each with a different one of a plurality of service providers. The described aspects also include apparatus and methods of an identity provider and a provisioning provider for managing identities in a multiple network environment, and apparatus and methods of a (Continued)

service provider for providing the device with access to a service.

30 Claims, 22 Drawing Sheets

Related U.S. Application Data

(60) Provisional application No. 61/496,519, filed on Jun. 13, 2011.

(51) Int. Cl.
| | |
|---|---|
| H04L 29/06 | (2006.01) |
| H04W 4/00 | (2009.01) |
| H04W 12/06 | (2009.01) |
| H04L 29/12 | (2006.01) |
| H04L 29/08 | (2006.01) |
| H04W 48/18 | (2009.01) |
| H04L 12/24 | (2006.01) |
| H04L 12/14 | (2006.01) |

(52) U.S. Cl.
CPC ........ *H04L 63/0815* (2013.01); *H04L 67/141* (2013.01); *H04W 4/001* (2013.01); *H04W 12/06* (2013.01); *H04L 12/1457* (2013.01); *H04L 12/1467* (2013.01); *H04L 41/0806* (2013.01); *H04L 61/6054* (2013.01); *H04W 48/18* (2013.01)

(58) Field of Classification Search
USPC ....................................................... 709/223
See application file for complete search history.

(56) References Cited

U.S. PATENT DOCUMENTS

| | | |
|---|---|---|
| 2002/0188736 A1 | 12/2002 | Jarvensivu |
| 2003/0188193 A1* | 10/2003 | Venkataramappa H04L 63/0815 726/10 |
| 2004/0243629 A1 | 12/2004 | Nomura et al. |
| 2004/0255031 A1 | 12/2004 | Nomura et al. |
| 2005/0050160 A1 | 3/2005 | Upendran et al. |
| 2007/0006291 A1 | 1/2007 | Barari et al. |
| 2007/0130343 A1 | 6/2007 | Pardo-Blazquez et al. |
| 2007/0209065 A1 | 9/2007 | Branam et al. |
| 2008/0127320 A1 | 5/2008 | De Lutiis et al. |
| 2010/0095003 A1 | 4/2010 | Zhao |
| 2010/0162370 A1 | 6/2010 | Altay et al. |
| 2011/0151924 A1 | 6/2011 | Miller |
| 2011/0213969 A1* | 9/2011 | Nakhjiri ................ H04L 63/061 713/158 |
| 2011/0265154 A1 | 10/2011 | Furlan et al. |
| 2011/0276645 A1 | 11/2011 | Andersson et al. |
| 2012/0317261 A1 | 12/2012 | Ahmavaara |

FOREIGN PATENT DOCUMENTS

| | | |
|---|---|---|
| JP | 2011066910 A | 3/2011 |
| WO | 2010022826 A1 | 3/2010 |
| WO | 2011078573 A2 | 6/2011 |

OTHER PUBLICATIONS

"3rd Generation Partnership Project; Technical Specification Group Services and System Aspects; General Packet Radio Service (GPRS); Service description; Stage 2 (Release 10)", 3GPP Standard; 3GPP TS 23.060, 3rd Generation Partnership Project (3GPP), Mobile Competence Centre; 650, Route Des Lucioles; F-06921 Sophia-Antipolis Cedex; France, vol. SA WG2, No. V10.4.0, Jun. 4, 2011 (Jun. 4, 2011), pp. 1-321, XP050552967, [retrieved on Jun. 4, 2011] paragraphs [0002], [9.2.0]-[9.2.2.2.1]; figures 63.67.

"3rd Generation Partnership Project; Technical Specification Group Services and System Aspects; IP Multimedia Subsystem (IMS); Stage 2 (Release 11)", 3GPP Standard; 3GPP TS 23.228, 3rd Generation Partnership Project (3GPP), Mobile Competence Centre; 650, Route Des Lucioles; F-06921 Sophia-Antipolis Cedex; France, vol. SA WG2, No. V11.1.0, Jun. 10, 2011 (Jun. 10, 2011), pp. 1-274, XP050552981, [retrieved on Jun. 10, 2011] paragraph [5.6.5.1].

"3rd Generation Partnership Project; Technical Specification Group Services and System Aspects; Policy and charging control architecture (Release 11)", 3GPP Standard; 3GPP TS 23.203, 3rd Generation Partnership Project (3GPP), Mobile Competence Centre; 650, Route Des Lucioles; F-06921 Sophia-Antipolis Cedex; France, vol. SA WG2, No. V11.2.0, Jun. 4, 2011 (Jun. 4, 2011), pp. 1-142, XP050552974, [retrieved on Jun. 4, 2011] paragraph [07.2]; figures 7.2-1.

"Eintrittskarte ins Internet—Single-Sign-On mit Kerberos and LDAP", Internet Citation, [Online] XP007902284, Retrieved from the Internet: URL:http://www.science-computing.de/downloads/s+c-fachartikel_sso_2006.pdf> [retrieved on May 11, 2007].

International Search Report and Written Opinion—PCT/US2012/042015—ISA/EPO—Jan. 31, 2013.

Partial International Search Report—PCT/US2012/042015—ISA/EPO—Nov. 16, 2012.

\* cited by examiner

APPARATUS AND METHODS OF IDENTITY MANAGEMENT IN A MULTI-NETWORK SYSTEM

CLAIM OF PRIORITY

The present application for patent claims priority to Provisional Application No. 61/496,519 entitled "Apparatus and Methods of Identity Management in a Multi-Network System" filed Jun. 13, 2011, and is a divisional of Non-Provisional application Ser. No. 13/493,974 entitled "Apparatus and Methods of Identity Management in a Multi-Network System" filed Jun. 11, 2012. Both the Provisional Application No. 61/496,519 and the Non-Provisional application Ser. No. 13/493,974 are assigned to the assignee hereof and hereby expressly incorporated by reference herein.

BACKGROUND

The present applications relates to a communication network, and more particularly to management of device-related identifiers in a communication network.

In current cellular systems, individual carriers own the device subscriber identity (e.g., an International Mobile Subscriber Identity, or IMSI). In order to enable widespread, pre-provisioned wireless data connectivity in cellular networks worldwide for a variety of wireless devices, device credentials must be allocated and programmed into the devices and also in the network elements that control access to the cellular networks.

Moreover, newly-developed and large scale mobile data communications service implementations require the pre-provisioning of millions of wireless devices at the factory, where at some point in time, the devices will need to be activated to access wireless networks around the world.

Thus, there remains a need in the art for pre-provisioning new multi-function devices with multiple mobile connectivity alternatives.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method of communication. The method may include receiving, from an identifier (ID) client on a wireless device, a request for an application specific identifier corresponding to an application service provider. In addition, the method may include generating the application specific identifier and mapping the application specific identifier to a device identifier of the wireless device. The method may also include sending the application specific identifier to the wireless device. The method may further include receiving a request to activate connectivity for the application specific identifier from the application service provider that sent the request to activate in response to receiving a request for service from the wireless device. Moreover, the method may include performing a lookup for the device identifier based on the received application specific identifier in the request to activate; and sending a connectivity request with the device identifier from the lookup to a network service provider to provide the connectivity to the wireless device.

Another aspect relates to at least one processor configured for communication. The processor may include a first module for receiving, from an identifier (ID) client on a wireless device, a request for an application specific identifier corresponding to an application service provider. The processor may also include a second module for generating the application specific identifier. In addition, the processor may include a third module for mapping the application specific identifier to a device identifier of the wireless device. The processor may include a fourth module for sending the application specific identifier to the wireless device. The processor may further include a fifth module for receiving a request to activate connectivity for the application specific identifier from the application service provider that sent the request to activate in response to receiving a request for service from the wireless device. The processor may also include a sixth module for performing a lookup for the device identifier based on the received application specific identifier in the request to activate. The processor may additionally include a seventh module for sending a connectivity request with the device identifier from the lookup to a network service provider to provide the connectivity to the wireless device.

Yet another aspect relates to a computer program product. The computer program product may include a computer-readable medium including at least one instruction for causing a computer to receive, from an identifier (ID) client on a wireless device, a request for an application specific identifier corresponding to an application service provider. The computer-readable medium may also include at least one instruction for causing the computer to generate the application specific identifier. The computer-readable medium may additionally include at least one instruction for causing the computer to map the application specific identifier to a device identifier of the wireless device; and at least one instruction for causing the computer to send the application specific identifier to the wireless device. The computer-readable medium may further include at least one instruction for causing the computer to receive a request to activate connectivity for the application specific identifier from the application service provider that sent the request to activate in response to receiving a request for service from the wireless device. The computer-readable medium may also include at least one instruction for causing the computer to perform a lookup for the device identifier based on the received application specific identifier in the request to activate. In addition, the computer-readable medium may include at least one instruction for causing the computer to send a connectivity request with the device identifier from the lookup to a network service provider to provide the connectivity to the wireless device.

Another aspect relates to an apparatus. The apparatus may include means for receiving, from an identifier (ID) client on a wireless device, a request for an application specific identifier corresponding to an application service provider; and means for generating the application specific identifier. The apparatus may further include means for mapping the application specific identifier to a device identifier of the wireless device. The apparatus may also include means for sending the application specific identifier to the wireless device; and means for receiving a request to activate connectivity for the application specific identifier from the application service provider that sent the request to activate in response to receiving a request for service from the wireless device. The apparatus may also include means for performing a lookup for the device identifier based on the received application specific identifier in the request to activate. Moreover, the apparatus may also include means for sending a connectivity request with the device identifier from the lookup to a network service provider to provide the connectivity to the wireless device.

Yet another aspect relates to an apparatus for communication. The apparatus may include a client identifier provider operable to: receive, from an identifier (ID) client on a wireless device, a request for an application specific identifier corresponding to an application service provider; generate the application specific identifier; map the application specific identifier to a device identifier of the wireless device; and send the application specific identifier to the wireless device; and a network services connection interface operable to: receive a request to activate connectivity for the application specific identifier from the application service provider that sent the request to activate in response to receiving a request for service from the wireless device; perform a lookup for the device identifier based on the received application specific identifier in the request to activate; and send a connectivity request with the device identifier from the lookup to a network service provider to provide the connectivity to the wireless device.

Still another aspect relates to a method of communication. The method may include receiving, from an identifier (ID) client on a wireless device, an identifier request for a network specific identifier corresponding to a network service provider with an initial connection to the wireless device. The method may also include generating the network specific identifier. The method may further include mapping the network specific identifier to a device identifier of the wireless device. In addition, the method may include sending the network specific identifier to the wireless device. The method may also include receiving an activation request to activate connectivity with the network service provider from an application service provider, wherein the activation request is in response to the application service provider receiving a service request for service from the wireless device. The method may also include performing a lookup for the network specific identifier based on the received activation request. Moreover, the method may include sending a connectivity request with the network specific identifier from the lookup to the network service provider to provide the connectivity to the wireless device associated with the network specific identifier.

Another aspect relates to at least one processor configured for communication. The processor may include a first module for receiving, from an identifier (ID) client on a wireless device, an identifier request for a network specific identifier corresponding to a network service provider with an initial connection to the wireless device. The processor may also include a second module for generating the network specific identifier. The processor may additionally include a third module for mapping the network specific identifier to a device identifier of the wireless device. The processor may also include a fourth module for sending the network specific identifier to the wireless device. The processor may further include a fifth module for receiving an activation request to activate connectivity with the network service provider from an application service provider, wherein the activation request is in response to the application service provider receiving a service request for service from the wireless device. In addition, the processor may also include a sixth module for performing a lookup for the network specific identifier based on the received activation request. The processor may also include a seventh module for sending a connectivity request with the network specific identifier from the lookup to the network service provider to provide the connectivity to the wireless device associated with the network specific identifier.

Yet another aspect relates to a computer program product. The computer program product may include a computer-readable medium including at least one instruction for causing a computer to receive, from an identifier (ID) client on a wireless device, an identifier request for a network specific identifier corresponding to a network service provider with an initial connection to the wireless device. The computer-readable medium may also include at least one instruction for causing the computer to generate the network specific identifier. The computer-readable medium may also include at least one instruction for causing the computer to map the network specific identifier to a device identifier of the wireless device. In addition, the computer-readable medium at least one instruction for causing the computer to send the network specific identifier to the wireless device. The computer-readable medium may further include at least one instruction for causing the computer to receive an activation request to activate connectivity with the network service provider from an application service provider, wherein the activation request is in response to the application service provider receiving a service request for service from the wireless device. The computer-readable medium may also include at least one instruction for causing the computer to perform a lookup for the network specific identifier based on the received activation request. Moreover, the computer-readable medium may also include at least one instruction for causing the computer to send a connectivity request with the network specific identifier from the lookup to the network service provider to provide the connectivity to the wireless device associated with the network specific identifier.

Another aspect relates to an apparatus. The apparatus may include means for receiving, from an identifier (ID) client on a wireless device, an identifier request for a network specific identifier corresponding to a network service provider with an initial connection to the wireless device. The apparatus may additionally include means for generating the network specific identifier; and means for mapping the network specific identifier to a device identifier of the wireless device. The apparatus may also include means for sending the network specific identifier to the wireless device; and means for receiving an activation request to activate connectivity with the network service provider from an application service provider, wherein the activation request is in response to the application service provider receiving a service request for service from the wireless device. The apparatus may further include means for performing a lookup for the network specific identifier based on the received activation request. The apparatus may also include means for sending a connectivity request with the network specific identifier from the lookup to the network service provider to provide the connectivity to the wireless device associated with the network specific identifier.

Another aspect relates to an apparatus for communication. The apparatus may include a network identifier provider operable to: receive, from an identifier (ID) client on a wireless device, an identifier request for a network specific identifier corresponding to a network service provider with an initial connection to the wireless device; generate the network specific identifier; map the network specific identifier to a device identifier of the wireless device; and send the network specific identifier to the wireless device; and a network services connection interface operable to: receive an activation request to activate connectivity with the network service provider from an application service provider, wherein the activation request is in response to the application service provider receiving a service request for service from the wireless device; perform a lookup for the network specific identifier based on the received activation request; and send a connectivity request with the network specific identifier from the lookup to the network service provider to provide the connectivity to the wireless device associated with the network specific identifier.

Yet another aspect relates to a method for providing services. The method may include receiving, from a wireless device, a service request including an application specific identifier corresponding to an application on the wireless device. The method may also include determining a data connectivity plan for use with the application specific identifier and the wireless device. In addition, the method may include sending, to an identity provider, a request to activate connectivity for the data connectivity plan.

Another aspect relates to at least one processor configured for providing services. The processor may include a first module for receiving, from a wireless device, a service request including an application specific identifier corresponding to an application on the wireless device. The processor may additionally include a second module for determining a data connectivity plan for use with the application specific identifier and the wireless device. The processor may also include a third module for sending, to an identity provider, a request to activate connectivity for the data connectivity plan.

Another aspect relates to a computer program product. The computer program product may include a computer-readable medium including at least one instruction for causing a computer to receive, from a wireless device, a service request including an application specific identifier corresponding to an application on the wireless device. The computer-readable medium may also include at least one instruction for causing the computer to determine a data connectivity plan for use with the application specific identifier and the wireless device. The computer-readable medium may further include at least one instruction for causing the computer to send, to an identity provider, a request to activate connectivity for the data connectivity plan.

Still another aspect relates to an apparatus. The apparatus may include means for receiving, from a wireless device, a service request including an application specific identifier corresponding to an application on the wireless device. The apparatus may also include means for determining a data connectivity plan for use with the application specific identifier and the wireless device. In addition, the apparatus may include means for sending, to an identity provider, a request to activate connectivity for the data connectivity plan.

Another aspect relates to an apparatus for providing services. The apparatus may include an access client operable to receive, from a wireless device, a service request including an application specific identifier corresponding to an application on the wireless device, determine a data connectivity plan for use with the application specific identifier and the wireless device, and send, to an identity provider, a request to activate connectivity for the data connectivity plan.

Another aspect relates to a method for providing data connectivity. The method may include receiving, from an identity provider, a connectivity request to provide connectivity to a wireless device, the connectivity request including a device identifier of the wireless device and data connectivity plan information for the connectivity. In addition, the method may include providing the connectivity to the wireless device based upon the received data connectivity plan information.

Yet another aspect relates to at least one processor configured for providing data connectivity. The processor may include a first module for receiving, from an identity provider, a connectivity request to provide connectivity to a wireless device, the connectivity request including a device identifier of the wireless device and data connectivity plan information for the connectivity. The processor may further include a second module for providing the connectivity to the wireless device based upon the received data connectivity plan information.

Another aspect relates to a computer program product. The computer program product may include a computer-readable medium including at least one instruction for causing a computer to receive, from an identity provider, a connectivity request to provide connectivity to a wireless device, the connectivity request including a device identifier of the wireless device and data connectivity plan information for the connectivity. The computer-readable medium may also include at least one instruction for causing the computer to provide the connectivity to the wireless device based upon the received data connectivity plan information.

Another aspect relates to an apparatus. The apparatus may include means for receiving, from an identity provider, a connectivity request to provide connectivity to a wireless device, the connectivity request including a device identifier of the wireless device and data connectivity plan information for the connectivity. The apparatus may further include means for providing the connectivity to the wireless device based upon the received data connectivity plan information.

Another aspect relates to an apparatus for providing data connectivity. The apparatus may include an access client operable to receive, from an identity provider, a connectivity request to provide connectivity to a wireless device, the connectivity request including a device identifier of the wireless device and data connectivity plan information for the connectivity and provide the connectivity to the wireless device based upon the received data connectivity plan information.

Still another aspect relates to a method for communication. The method may include receiving, from an application, a request for an application specific identifier corresponding to an application service provider for the application. The method may also include sending, to an identity provider, the request for the application specific identifier. In addition, the method may include receiving, from the identity provider, the application specific identifier. The method may also include sending, to the application service provider, a service request to use with the application specific identifier and a network service provider. The method may further include receiving, from the network service provider, data connectivity to access the services provided by the application service provider for the application.

Another aspect relates to at least one processor configured for communication. The processor may include a first module for receiving, from an application, a request for an application specific identifier corresponding to an application service provider for the application. The processor may also include a second module for sending, to an identity provider, the request for the application specific identifier. In addition, the processor may include a third module for receiving, from the identity provider, the application specific identifier. The processor may further include a fourth module for sending, to the application service provider, a service request to use with the application specific identifier and a network service provider. Moreover, the processor may include a fifth module for receiving, from the network service provider, data connectivity to access the services provided by the application service provider for the application.

Another aspect relates to a computer program product. The computer program product may include a computer-readable medium including at least one instruction for causing a computer to receive, from an application, a request for an application specific identifier corresponding to an application service provider for the application. The computer-readable medium may also include at least one instruction for causing the computer to send, to an identity provider, the request for the application specific identifier. The computer-readable medium may additionally include at least one instruction for causing the computer to receive, from the identity provider, the application specific identifier. The computer-readable medium may also include at least one instruction for causing the computer to send, to the application service provider, a service request to use with the application specific identifier and a network service provider. In addition, the computer-readable medium may include at least one instruction for causing the computer to receive, from the network service provider, data connectivity to access the services provided by the application service provider for the application.

Yet another aspect relates to an apparatus. The apparatus may include means for receiving, from an application, a request for an application specific identifier corresponding to an application service provider for the application. The apparatus may also include means for sending, to an identity provider, the request for the application specific identifier. The apparatus may further include means for receiving, from the identity provider, the application specific identifier. In addition, the apparatus may include means for sending, to the application service provider, a service request to use with the application specific identifier and a network service provider. Moreover, the apparatus may include means for receiving, from the network service provider, data connectivity to access the services provided by the application service provider for the application.

Another aspect relates to an apparatus for communication. The apparatus may include an identifier client operable to receive, from an application, a request for an application specific identifier corresponding to an application service provider for the application, send, to an identity provider, the request for the application specific identifier, and receive, from the identity provider, the application specific identifier. In addition, the apparatus may include a client services connection interface operable to send, to the application service provider, a service request to use with the application specific identifier and a network service provider. The apparatus may also include a network services connection interface operable to receive, from the network service provider, data connectivity to access the services provided by the application service provider for the application.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described apparatus and methods, in an aspect, establish a device or device maker centric cellular data ecosystem. In this model, the owner of the device/subscriber identity can be a provider of all or a portion of the device, as opposed to a network service provider. In further aspects, the device is able to seamlessly operate across multiple wireless network service providers, or across multiple application service providers, respectively based on a single device-specific network identifier, e.g. a network service subscriber identity, or a single device-specific client identifier, e.g. an application service subscriber identity, each of which is verifiable via an independent network or client/application identity service provider, which is trusted by each network/application service provider. As such, the single device-specific network service subscriber identity and the single device-specific application service subscriber identity respectively can be associated with different network and application service subscriber accounts corresponding to different network and application service providers, thereby allowing the respective single identity to act as a universal identity across multiple service providers.

Figure 1:
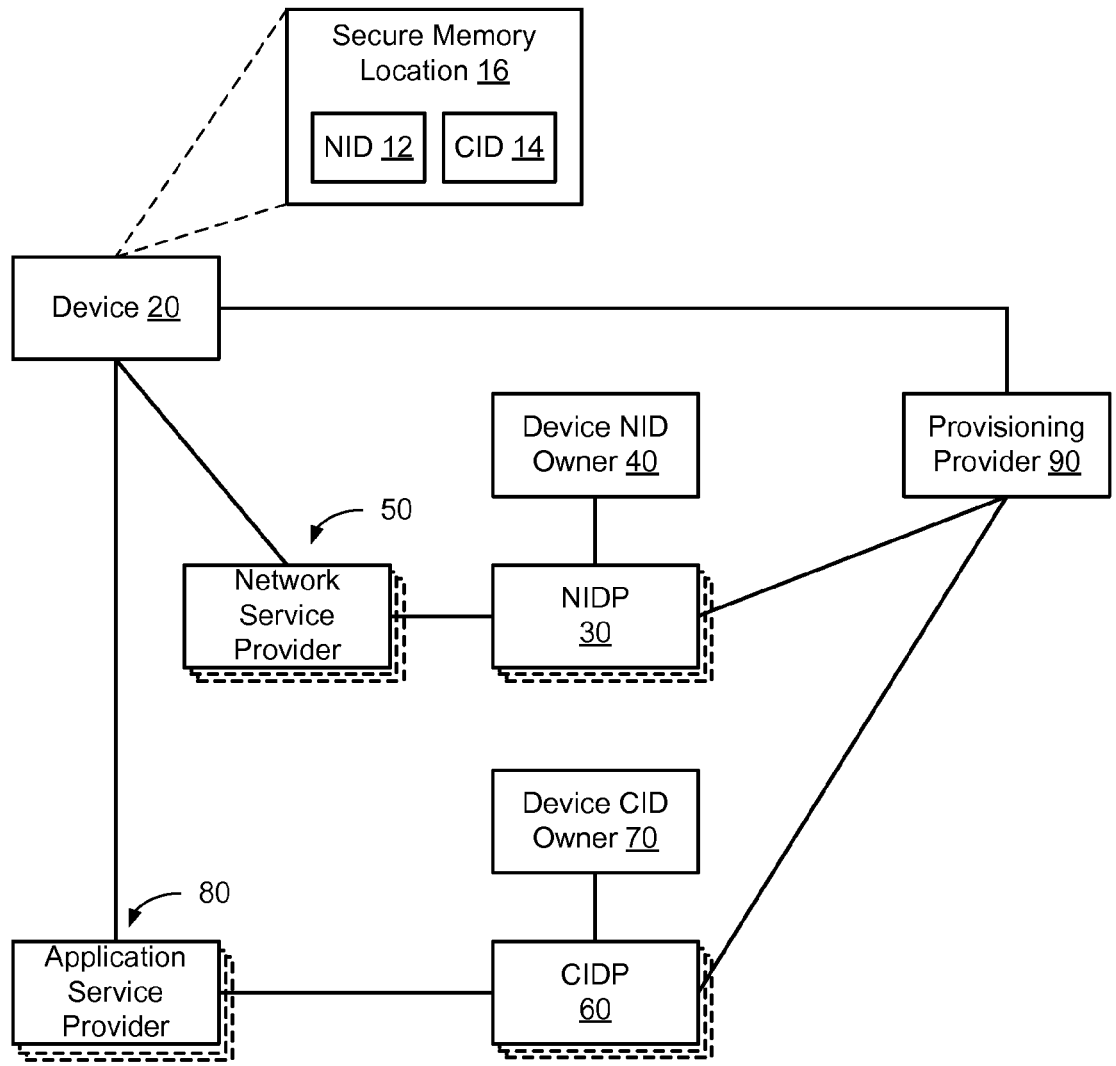
FIG. 1 is a schematic diagram of an aspect of an architecture of a communication system.

Referring to FIG. 1, in one aspect, a communication system 10 includes a device 20 having a unique, device-specific network identifier (NID) 12 and a unique, device-specific client identifier (CID) 14 respectively associated with, assigned from, and verifiable through, a network identifier provider component (NIDP) 30 and a client identifier provider component (CIDP) 60. NID 12, or a representation or derivation thereof, may be utilized, for example, to verify an identity of device 20 for receiving network communication services. For instance, NID 12 may be similar to, or may act as, or may include an International Mobile Subscriber Identity (IMSI), a Temporary IMSI (TIMSI), or any other form of network subscriber identification. CID 14, or a representation or derivation thereof, may be utilized, for example, to verify an identity of device 20 for application level services. For example, CID 14 may allow an application server to verify an identity of device 20 before interacting with a corresponding client application executing on device 20. NIDP 30 and CIDP 60 may be separate network entities, or different functional components within a single network entity that obtain or generate NIDs and CIDs, respectively, and manage assignment of the NIDs and CIDs to devices. Moreover, although FIG. 1 illustrates a single NIDP 30 and a single CIDP 60, communication system 10 may include any number of NIDPs 30 and CIDPs 60.

In an aspect, NIDP 30 is trusted by, and/or directly accessible to, a plurality of network service providers 50 for verifying the authenticity of device-specific NID 12, or a representation or derivation thereof, and hence verifying an identity of device 20 and/or a subscriber services account corresponding to device 20. In an aspect, for example, the plurality of network service providers 50 may provide mobile broadband connectivity services. As such, in this aspect, a single device-specific NID 12 may independently provide a basis for verifying an identity of device 20 for use in network authorization and access to the plurality of network service providers 50. Accordingly, NIDP 30 may be referred to as a "universal" network identifier provider, and NID 12 may be referred to as a "universal" network subscriber identifier, as device-specific NID 12 is not owned or controlled by a single network service provider, but is owned and controlled independently from the plurality of network service providers 50 yet provides a universal or common basis for identity verification for each of the plurality of network service providers 50. In other words, a single device-specific NID 12 may be associated with a respective network service subscriber account of each of the plurality of network service providers 50, thereby enabling device 20 to wirelessly communicate via a network associated with any of the plurality of network service providers 50.

In an aspect, while the enablement of connecting via a network associated with any of the plurality of the network service providers 50 is based on the verification of the device specific NID 12 by the NIPD 30, the actual network services to be received by the device from each of the respective network service provider 50 are based on the status of the service subscriber account at the respective network service provider. The status of the service subscriber account at the respective network service providers 50 may not be known by the NIPD 30.

In another aspect, CIDP 60 is trusted by, and/or directly accessible to, a plurality of application service providers 80 for verifying the authenticity of client-specific CID 14, or a representation or derivation thereof, and hence a client identity of device 20. As such, in this aspect, a single device-specific CID 14 may independently provide a basis for application service authorization and access for the plurality of application service providers 80. Accordingly, CIDP 60 may be referred to as a "universal" client identifier provider as device-specific CID 14 is not owned or controlled by a single application service provider, but is owned and controlled independently from the plurality of application service providers 80 yet provides a universal or common basis for identity verification for each of the plurality of application service providers 80. In other words, a single device-specific CID 14 may be associated with a respective application service subscriber account in each of the plurality of application service providers 80, thereby enabling device 20, or an application executing thereon, to identify itself with any of the plurality of application service providers 80.

In an aspect, NIDP 30 maintains a relationship between each device-specific NID 12 and a corresponding device NID owner 40, which may include a maker of device 20, a maker of a portion of device 20, a user of device 20, the owner of the device or any other entity having a relation to the device. Similarly, CIDP 60 maintains a relationship between each device-specific CID 14 and a corresponding device CID owner 70, which may include a maker of device 20, a maker of a portion of device 20, a user of device 20, the owner of the device or any other entity having a relation to the device. In some aspects, NID owner 40 and CID owner 70 may be a same entity or party, while in other aspects NID owner 40 and CID owner 70 may be different.

Notably, in contrast with prior art solutions, in the present apparatus and methods NID owner 40 and CID owner 70 are respectively different from, and independent of, the plurality of network service providers 50 and the plurality of application service providers 80. As such, in an aspect, NID owner 40 may select NIDP 30 from a plurality of NIDPs, and CID owner 70 may select CIDP 60 from a plurality of CIDPs, for example, based on one or more of fees charged by the respective NIDPs or CIDPs, network service providers 50 or application service providers 80 supported by the respective NIDP or CIDP, or for other business reasons. Moreover, NID owner 40 and CID owner 70 may initially select one NIDP 30 or CIDP 60, and later switch to another NIDP or CIDP.

Figure 2:
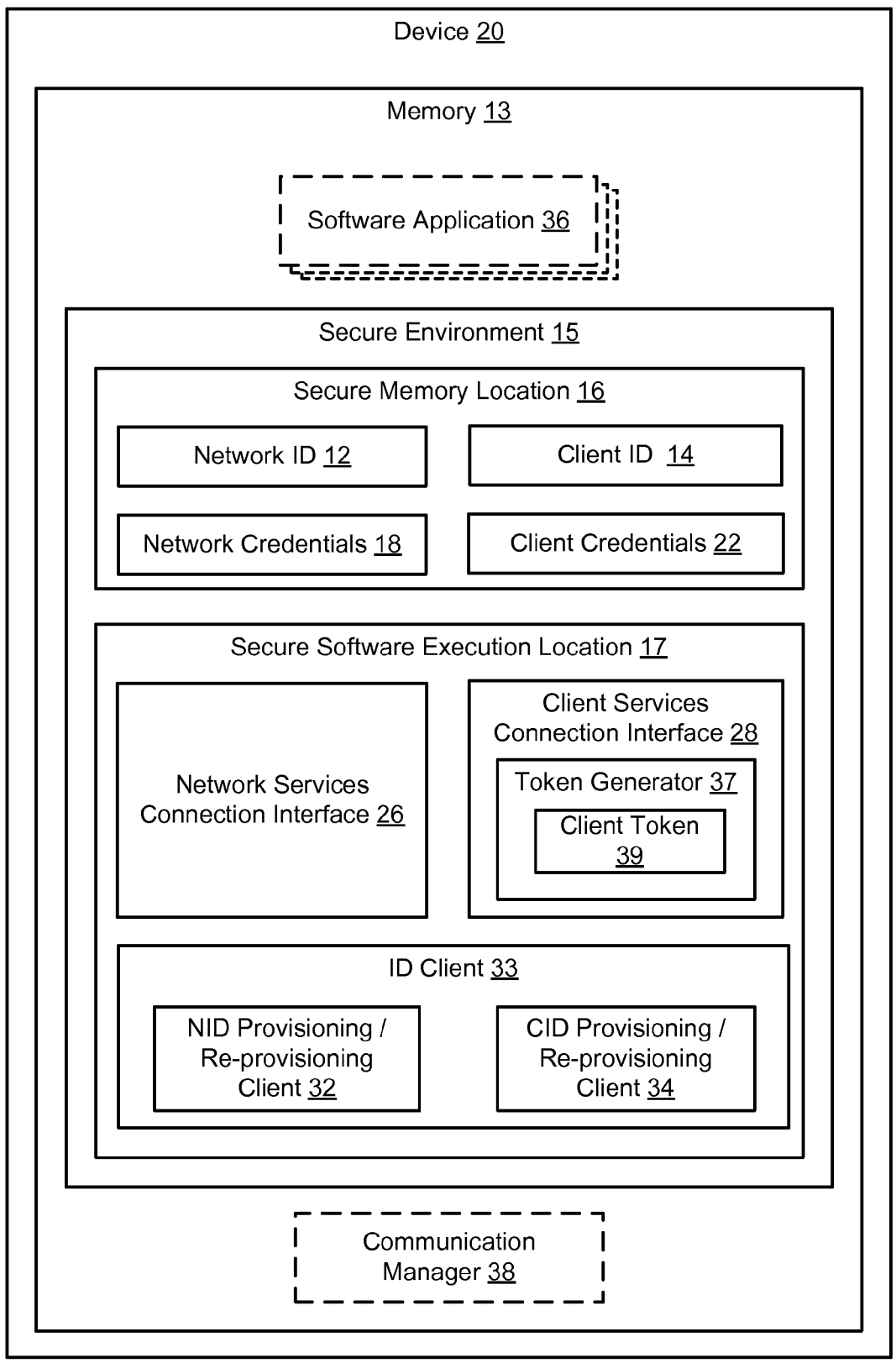
FIG. 2 is a schematic block diagram of an aspect of the device in FIG. 1.

In an aspect, device 20 stores device-specific NID 12 and device-specific CID 14 in a secure environment 15 (FIG. 2). For example, secure environment 15 may be a portion of a memory having restricted access, such that an ability to write data to secure environment 15 may be based on a privilege. In an aspect, communication system 10 may further include a provisioning provider 90 in communication with NIDP 30 and/or CIDP 60, where provisioning provider 90 has the privilege to write to, or cause data to be written to, secure environment 15, and thereby to provision device 20 with NID 12 and CID 14. Also, provisioning provider 90 may write other related data to secure memory environment 15, such as network service credentials, application service credentials, client side identity verification or generation software as required by the respective identity provider, etc., as will be discussed in more detail below. As such, in some aspects, provisioning provider 90 may add network service-related and/or application service-related data to secure memory location 16, such as in the case of adding an ability to communicate with a new network service or application service, or may delete or over-write previously stored network service-related and/or application service-related data, such as in the case of removing access to a network service or application service or re-provisioning based on selection of a new NIDP 31 (FIG. 3) and/or CIDP 60. In one aspect the provisioning provider 90 and NIPD 30 and/or CIPD 60 may be separate entities, or different functional components within a single entity or different entities.

Thus, communication system 10 enables a new paradigm for identity management in a multi-network communication system by providing a single device-specific NID 12 and a single device-specific CID 14 that are respectively verifiable by a multitude of network service providers and a multitude of application service providers via NIDP 30 and CIDP 60, thereby enabling the single device-specific NID 12 to be associated with a respective network service subscriber accounts of each of the plurality of network service providers 50, and thereby enabling the single device-specific CID 14 to be associated with a respective application service subscriber account in each of the plurality of application service providers 80. In other words, the apparatus and methods of identity management in communication system 10 provide a universal identifier management system, which avoids the constraints of network service provider specific or/and application service provider specific identity management systems.

Referring now to FIG. 2, illustrated is an example an aspect of device 20 with a memory or data store 13 including a secure environment 15 having a secure memory location 16 and a secure software execution location 17. In an aspect, device 20 may be a cellular data modem, a 3G modem, a 4G modem, another data communication device or a universal integrated circuit card (UICC). Further, in an aspect, secure environment 15 may be an area located within a cellular data modem, a wireless data modem, a UICC card, a wireless chipset, a processor, an operating system or some other entity. As discussed above, secure environment 15, and thus secure memory location 16 and secure software execution location 17, may be an area within memory or data store 13 having restricted access, such that an ability to write data to secure environment 15 may be based on a privilege. In an aspect, secure memory location 16 may include network ID (NID) 12 and associated network credentials 18, which may provide device 20, for example, the ability to authenticate itself and/or communicate with one or more network service providers 50. Network credentials 18 may include, but are not limited to, data and/or algorithms that enable authentication of device 20 and/or access to one or more network service providers 50. For example, network credentials 18 may include, but are not limited to, one or any combination of a security or encryption key or algorithm, a random number generator, a network service provider identifier, a network access parameter, network related software, among other network credentials.

In addition, in an aspect, secure memory location 16 may further include client ID (CID) 14 and associated client credentials 22, which may provide device 20, for example, the ability to authenticate itself and/or communication with one or more application service providers 80. Client credentials 22 may include, but are not limited to, one or any combination of security or encryption keys or algorithms, an application identifier, an application service provider identifier, application service-related software, application-related data or other parameters that enable authentication of device 20 and/or access to one or more application service providers 80.

In an aspect, secure software execution location 17 may include a network services connection interface 26 operable to enable interactions between device 20 and one or more network service providers 50. For example, network services connection interface 26 assists in requesting network connections, authentication of device 20 and/or NID 12, and accessing a network service provider. Network services connection interface 26 may include, but is not limited to, one or more of an application programming interface to provide communications between one or more applications 36 in memory 13 on device 20 or components on or in communication with device 20 and secure memory location 16, specifically NID 12 and network credentials 18, an application programming interface to provide communications between device 20 and one or more network service providers 50, a software application or algorithm, or any other mechanism to facilitate the described interactions and communications. For instance, in one case, network services connection interface 26 may interact with a component, such as a communication manager 38, on device 20 or in communication with device 20. In this case, communication manager 38, which may be hardware, software, or firmware, may detect or become aware of a network that may be used for communication, and network services connection interface 26 and communications manager 38 operate to exchange messages with the network to identify device 20 and potentially access the network.

In addition, secure software execution location 17 may further include a client services connection interface 28 operable to enable interactions between device 20, or one or more software applications 36, and one or more application service providers 80. In an aspect, client services connection interface 28 provides services between device 20 and application service providers 80 in a similar manner as the services provided by network services connection interface 26 between device 20 and network service providers 50. For example, client services connection interface 28 assists in requesting communication with an application service provider, such as an application server, authentication of device 20 and/or CID 14, and accessing the application service provider. Client services connection interface 28 may include, but is not limited to, one or more of an application programming interface to provide communications between one or more applications 36 in memory 104 on device 20 or components on or in communication with device 20 and secure memory location 16, specifically CID 14 and client credentials 22, an application programming interface to provide communications between device 20 and one or more application service providers 80, a software application or algorithm, or any other mechanism to facilitate the described interactions and communications. In an aspect, for example, client services connection interface 28 includes a client token generator 37 operable to generate a client token 39 capable of authenticating CID 14 of device 20. For example, client token generator 37 may include an encryption algorithm to generate client token 39 that may include, for example, CID 14 and an authentication mechanism, such as a signature of CIDP 60, which verifies CID 14 in client token 39. Further, client token 39 may include other components generated by token generator 37 or the entity requesting the token from the token generator, such as parameter, e.g. a random number, used in the encryption/decryption algorithm, a hash or other security mechanism applied to client token 39 or CID 14 so that CID 14 is not transmitted in the clear, etc. For instance, in one case, application 36 may be launched on device 20, and application 36 is associated with an application service provider 80. Accordingly, application 36 utilizes the services of client services connection interface 28 in order to authenticate device 20 to the respective application service provider 80, via transmitting client token 39 to the application service provider 80 and possibly exchanging addition security and/or authentication messages, depending on the authentication protocol in use.

In addition, secure software execution location 17 may include an ID client 33 which may include a NID provisioning/re-provisioning client 32 and a CID provisioning/re-provisioning client 34 that may be operable respectively to receive, for example, the NID 12 and network credentials 18, and CID 14 and client credentials 22, and/or other network service-related or client/application service-related identity verification or generation software as utilized by the respective identity provider, network service provider, or application service provider. NID provisioning/re-provisioning client 32 and CID provisioning/re-provisioning client 34 have a trust relationship with provisioning provider 90, such that provisioning provider 90 has the privilege or ability to write to secure environment 15 and add network service-related and/or application service-related identifiers, data, algorithms, parameters, etc., and to perform other provisioning-related operations with respect to secure environment 15. For instance, as noted above, such provisioning or re-provisioning operations may include, but are not limited to, adding or updating an ability to communicate with a new network service provider or a new application service provider, or deleting or over-writing previously stored network service-related and/or application service-related data, such as in the case of removing access to a network service provider or application service provider or re-provisioning based on selection of a new NIDP 31 (FIG. 3) and/or CIDP 60.

In an aspect, NID 12 and/or CID 14 may include, either as an additional component or inherently based on their value, a pointer to the respective identity provider, e.g. NIDP 30 and/or CIDP 60, which issued the NID 12 and/or CID 14. As such, a service provider, e.g. network service provider 50 (FIG. 1) and/or application service provider 80 (FIG. 1), may know which identity provider to query, or which authentication mechanism to utilize, to authenticate NID 12 and/or CID 14, or representations or derivations thereof (e.g. client token 39). For example, network service provider 50 (FIG. 1) and/or application service provider 80 (FIG. 1), upon determining the pointer and hence NIDP 30 and/or CIDP 60, may apply a corresponding authentication algorithm, such as a public key and/or other authentication mechanisms corresponding to NIDP 30 and/or CIDP 60 in order to authenticate the received identifier.

Further, in an aspect where NID 12 may be utilized in place of an IMSI, NID 12 may include a mobile country code (MCC) and a mobile network code (MNC).

Figure 3:
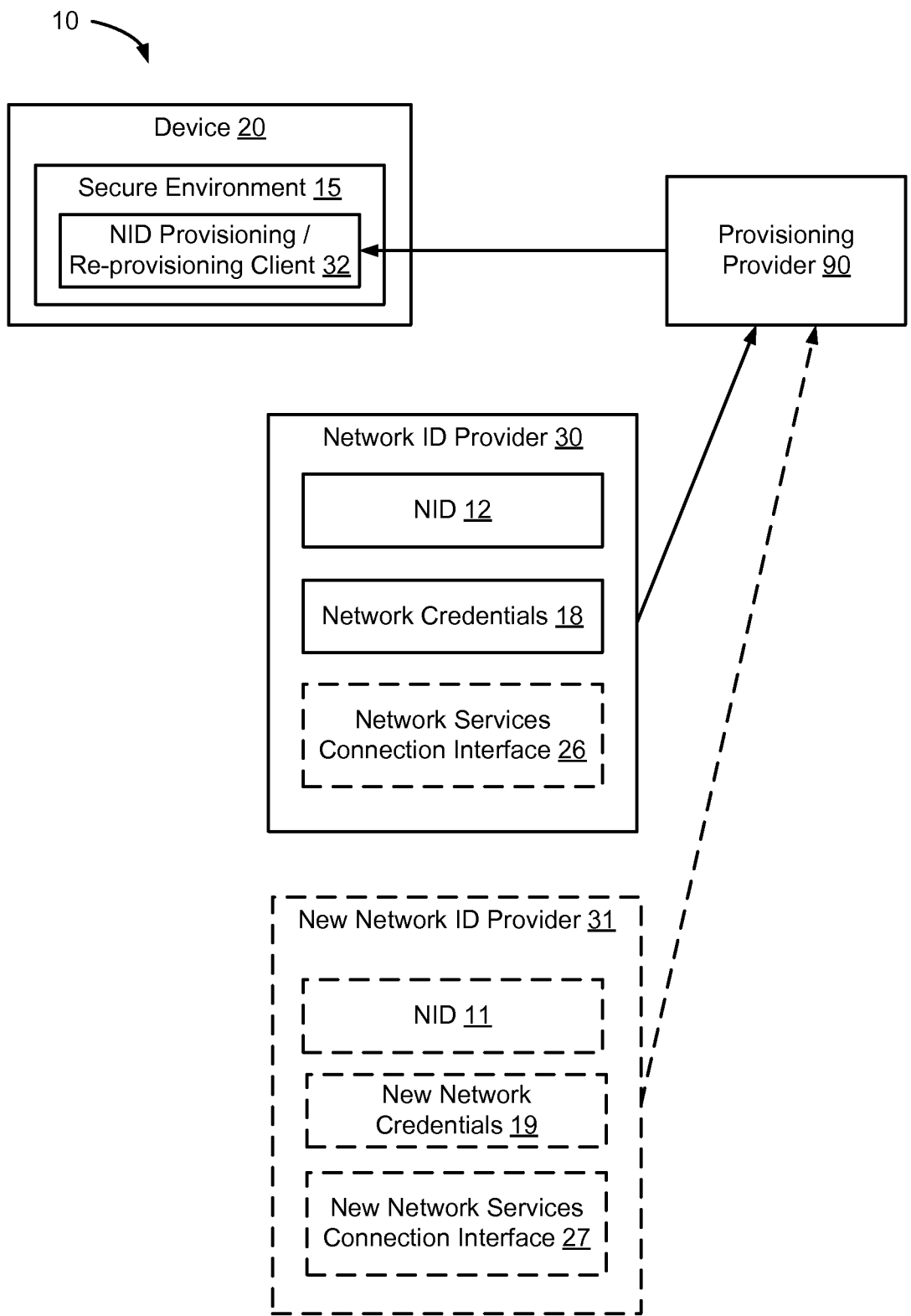
FIG. 3 is a schematic diagram of an aspect of provisioning or re-provisioning a device-specific network identifier in the system of FIG. 1.

Referring now to FIG. 3, illustrated is an example interaction in communication system 10 of provisioning or re-provisioning device 20 for network service. In this aspect, provisioning provider 90 is in communication with NIDP 30, and provisioning provider 90 has the privilege to write to, or cause data to be written to, secure environment 15 on device 20. Accordingly, upon receiving a command and the corresponding data from NIDP 30, provisioning provider 90 communicates with NID provisioning/re-provisioning client 32 to provision device 20 with NID 12 and/or network credentials 18 and/or a network services connection interface 26. In an aspect, provisioning provider 90 may determine an association between the device-specific NID 12 and device 20. For example, in an aspect, a device identity owner may inform provisioning provider 90 that a new device or a device previously identified by a specific NID is to receive NID 12 and the associated credentials, and provisioning provider 90 thereby matches the request with appropriate device. In an aspect, for example, network credentials 18 and/or network services connection interface 26 may provide device 20 with client side identity verification or generation software as required by NIDP 30. Provisioning provider 90 and NIPD 30 may be separate entities, or different functional components within a single entity.

Further, NID 12 and/or network credentials 18 and/or a network services connection interface 26 may provide device 20 with the ability to communicate with one or more network service providers 50 that have a trust relationship with NIDP 30. For example, NIDP 30 may be trusted by, and/or directly accessible to, a plurality of network service providers 50 for verifying the authenticity of device-specific NID 12, or a representation or derivation thereof, and hence verifying a subscriber identity of device 20. As such, in this aspect, a single device-specific NID 12 may independently provide a basis for verifying a subscriber identity of device 20 for use in network authorization and access to the plurality of network service providers 50.

In an aspect, provisioning provider 90 may forward the received NID 12 and/or network credentials 18 and/or network services connection interface 26 to NID provisioning/re-provisioning client 32 on device 20 so that NID provisioning/re-provisioning client 32 may store the information in secure environment 15 in order to add an ability to communicate with a new network service, or to delete or overwrite previously stored network service-related data, such as in the case of removing access to a network service or re-provisioning a new NID 11, new network credentials 19, and/or a new network services connection interface 27, for example, based on selection of a new NIDP 31 by NID owner 40.

For example, new NIDP 31 may provide provisioning provider 90 with a new NID 11 (e.g. in the case where NID 12 is exclusive to NIDP 30), new network credentials 19, and new network services connection interface 27 for accessing network service providers associated with new NIDP 31 and/or for authenticating device 20 with network service providers 50 via new NIDP 31. New network credentials 19 may be utilized, for example, when NIDP 30 is no longer available. New NID 11, new network credentials 19 and/or new network services connection interface 27 may also be utilized if, for example, new NIDP 31 has different associated or partner network service providers relative to network service providers 50 associated or partnered with NIDP 30. It should be noted that in some aspects, NID 12 may not change upon a change in NIDPs, but device 20 may receive only new network credentials 19 and/or new network services connection interface 27. It should be appreciated that new NID, new network credentials and/or new network services connection interfaces may be provided for a variety of reasons.

Figure 4:
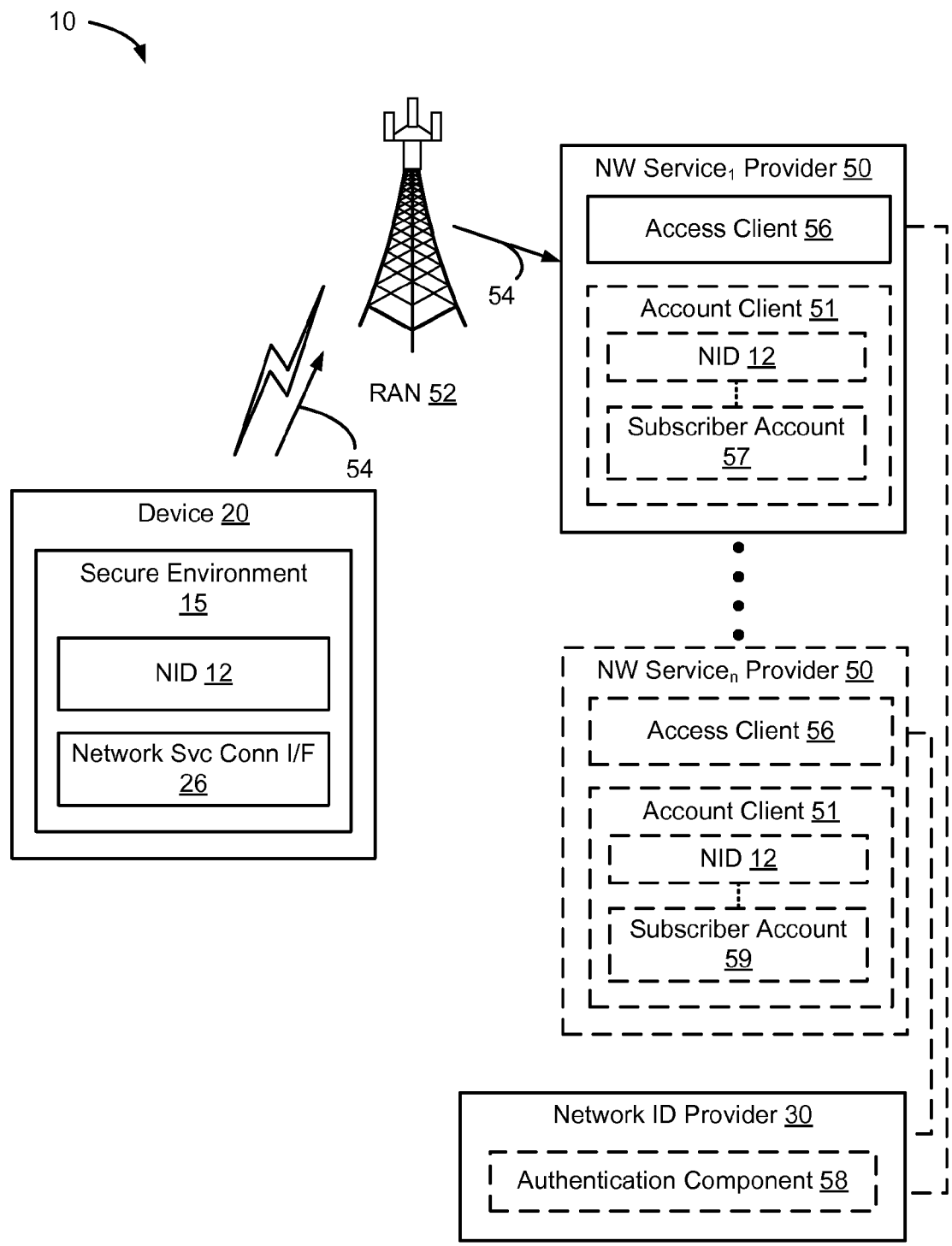
FIG. 4 is a schematic diagram of an aspect of usage of the device-specific network identifier in the system of FIG. 1.

Referring now to FIG. 4, illustrated is an example interaction in communication system 10 of utilizing NID 12 to enable device 20 to access any number, n, of network service providers 50. Device 20 may detect radio access network (RAN) 52, which may be associated with one of the plurality of network service providers 50, and may transmit a request 54 for connectivity to one or more network services using network services connection interface 26. Network services connection interface 26 may include NID 12, or a representation or derivation thereof, and/or network credentials 18 associated NIDP 30, in request 54. For example, network credentials 18 may include security or encryption mechanisms associated with NIDP 30, such as a digital signature of NIDP 30, encryption/decryption parameters, etc. Further, in an aspect, request 54 may include an identifier or pointer, as discussed above, corresponding to NIDP 30 such that a receiving network service provider may know which NIDP to use to verify the authenticity of NID 12 in request 54. RAN 52 may forward request 54 to one of the plurality of network service providers 50, such as an associated network service provider, e.g. a network service provider that owns, controls, or manages RAN 52.

Upon receiving the connection request 54, an access client 56 at or associated with the respective network service provider 50 is operable to verify the identity, e.g. NID 12, of device 20 before providing the requested network connection. It should be appreciated that a plurality of verification and/or authentication methods may be used in verifying the subscriber identity, e.g. NID 12, of device 20.

In an aspect, access client 56 may verify the NID 12 with the associated NIDP 30 before providing the requested connection to device 20. For example, network service provider 50 may have an established trust relationship with NIDP 30 such that if NIDP 30 verifies and/or authenticates NID 12, network service provider 50 may provide access to device 20 based upon the trust relationship established with NIDP 30. Access client 56 may verify NID 12 either directly or indirectly. For example, in an aspect, request 54 and/or a portion thereof, such as NID 12 or a representation or derivation thereof, may be encrypted using a private key of NIDP 30. In this case, network service provider 50 may have or may obtain the corresponding public key of NIDP 30 and use the public key to decrypt request 54, thereby authenticating NID 12. It should be understood that the above private key/public key is just one example, and that other indirect authentication methods may be utilized.

In another aspect, a direct authentication method may include network service provider 50 forwarding an authentication information request, e.g. including the received request 54 or a portion thereof such as NID 12, to the NIDP 30 associated with NID 12 along with a request to verify the authenticity of NID 12 and the subscriber identity of device 20. In this case, NIDP 30 may have an authentication component 58 for receiving the authentication information request and returning authentication information, e.g. authenticating one or more NIDs 12 associated with one or more devices 20, to the respective service provider. For example, authentication component 58 may include encryption/decryption algorithms, mappings of valid NIDs to devices, etc., which allows authentication component 58 to determine NID associated with request 54 and determine if the received NID matches a valid NID in one of the mappings. If the received NID 12 is valid, NIDP 30 may send a response, e.g. the authentication information, to network service provider 50 authenticating NID 12. If, however, the received NID 12 is not valid, NIDP 30 may send a response to network service provider 50 indicating that NID 12 is not valid.

Upon verifying the authenticity of NID 12, the network service provider 50 associated with RAN 52 may allow RAN 52 to provide a communication connection and/or other network services to device 20. In one aspect, the respective network service provider 50 associated with RAN 52 may provide network access to device 20 based upon, for example, a roaming agreement established with NIDP 30 and/or another one of the plurality of network service providers 50. In another aspect, network service provider 50 may use the network credentials 18 received from device 20 to set parameters for the network access provided to device 20. For example, network credentials 18 may identify a subscriber type, one or more device capabilities, quality of service parameters, etc. that are to be applied to network access provided to device 20.

In another aspect, network service provider 50 may include an account client 51 to establish a new network service subscriber account 57 with device 20 for providing network access to device 20. In an aspect, account client 51 then maintains a relationship between NID 12 and subscriber account 57. For example, network service provider 50 may prompt a user of device 20 to provide relevant account setup information, e.g. name, address, contact information, as well as payment information to network service provider 50 to setup subscriber account 57 for the requested connectivity. Similarly, another one of the plurality of network service providers 50 may have had, or may have in the future, a similar request for network connectivity from device 20. As such, another one of the plurality of network service providers 50 may have another subscriber account, e.g. subscriber account 59, associated with NID 12 and device 20. Thus, NID 12 may be the subscriber identifier associated with different subscriber accounts, e.g. subscriber account 57 and subscriber account 59, at more than one of the plurality of network service providers 50.

In other words, RAN 52 may be associated with any one of the plurality of network service providers 50. As such, the plurality of network service providers 50 may each use the same, device-specific NID 12 associated with device 20 for authenticating device 20. Thus, NID 12 enables access to the plurality of network service providers 50 that have a trust relationship with NIDP 30 and use the trust relationship to authenticate device 20 without device 20 being previously associated with the particular network service providers 50.

It should be noted that the NID usage for network access interactions described above with reference to FIG. 4, and the components performing these interactions, such as access client 56, may perform protocols based on 3GPP and 3GPP2 specifications, e.g. for verifying a subscriber identification based on an IMSI, where NID 12 or a representation or derivation thereof takes the role of 3GPP or 3GPP2 identifier such as the IMSI. In solutions based on 3GPP or 3GPP2 specifications the NIPD typically operates a HLR, a HSS and/or an AAA server as specified in the respective 3GPP/GPP2 specification. The usage of the NID in lieu of carrier specific IMSI for authenticating the device towards a 3GPP or 3GPP2 network may be transparent to the network service provider, i.e. the NID authentication method and network access based on NID follows the existing mechanisms applicable to authenticate and provide network services to a device identified by a carrier specific IMSI.

Figure 5:
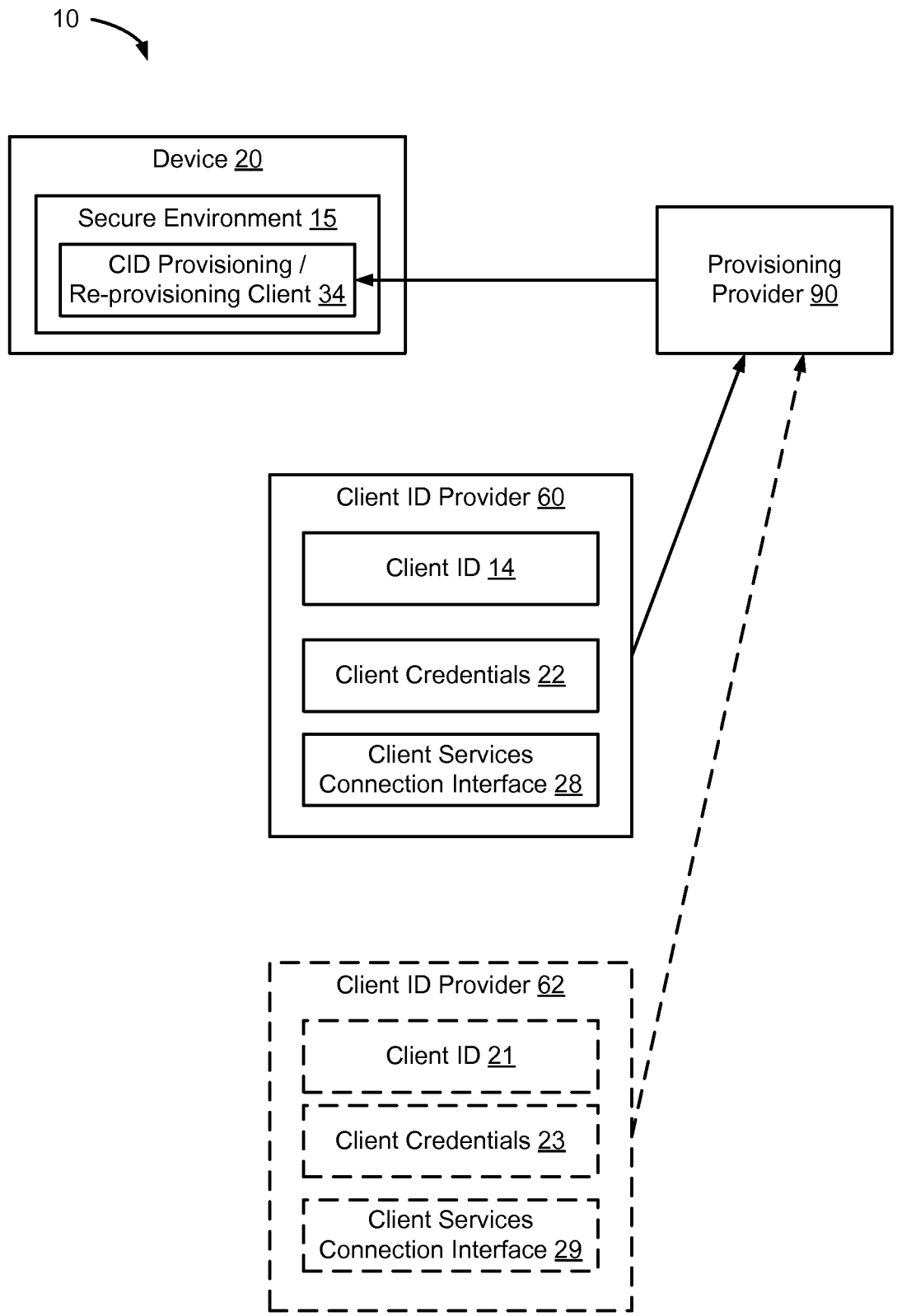
FIG. 5 is a schematic diagram of an aspect of provisioning or re-provisioning a device-specific client identifier in the system of FIG. 1.

Referring now to FIG. 5, illustrated is an example interaction in communication system 10 of provisioning or re-provisioning device 20 with a CID 14 for use in enabling application services. Provisioning provider 90 is in communication with CIDP 60, and provisioning provider 90 has the privilege to write to, or cause data to be written to, secure environment 15. As such, upon receiving a command and/or the data from CIDP 60, provisioning provider 90 provisions device 20 with CID 14, and/or client credentials 22 and/or a client services connection interface 28, including token generator 37.

Further, CID 14 or client token 39 and/or client credentials 22 and/or a client services connection interface 28 may provide device 20 with the ability to communicate with one or more application service providers 80 that have a trust relationship with CIDP 60. For example, if CIDP 60 is trusted by plurality of application service providers 80, the plurality of application service providers 80 may provide device 20 and/or an application 36 thereon with application services upon verifying the authenticity of device-specific CID 14, or a representation or derivation thereof, such as client token 39. As such, device-specific CID 14 effectively serves as an application services subscriber identifier of device 20. Accordingly, in this aspect, a single device-specific CID 14 may independently provide a basis for application service authorization and access for the plurality of application service providers 80.

Provisioning provider 90 and CIPD 60 may be separate entities, or different functional components within a single entity. Also, it should also be appreciated that client credentials 22 and client services connection interface 28 for accessing application service providers 80 may be independent of the network credentials 18 and network services connection interface 26 for accessing network service providers 50

In an aspect, provisioning provider 90 may forward the received CID 14 or client token 39, and/or client credentials 22 and/or client services connection interface 28 to CID provisioning/re-provisioning client 34 on device 20 so that CID provisioning/re-provisioning client 34. As CID provisioning/re-provisioning client 34 has a trust relationship with provisioning provider 90, and based on the privilege of provisioning provider 90, CID provisioning/re-provisioning client 34 stores the received data in secure environment 15. As such, the newly stored data may add an ability to communicate with a new application service, or may delete or over-write previously stored application service-related data, such as in the case of removing access to a application service or re-provisioning based on selection of a new CIDP 62 and thereby acquiring a new CID 21, new client credentials 23 and/or new client services connection interface 29.

For example, device CID owner 70 may select a new client identity provider, and thus CIDP 60 may provide provisioning provider 90 with new CID 21 (e.g. in the case where CID 14 is exclusive to CIDP 60), new client credentials 23 and/or new client services connection interface 29 for accessing new application service providers and/or authenticating with new CIDP 62. New client credentials 23 and/or new client services connection interface 29 may be utilized, for example, if CIDP 60 is no longer available. New CID 21, new client credentials 23 and/or new client services connection interface 29 may also be utilized if, for example, new CIDP 62 has different application service providers relative to the application service providers associated with CIDP 60. It should be noted that in some aspects, CID 14 may not change upon a change in CIDPs, but device 20 may receive only new client credentials 23 and/or new client services connection interface 29. It should be appreciated that new CID, new client credentials and/or new client services connection interfaces may be provided for a variety of reasons.

Figure 6:
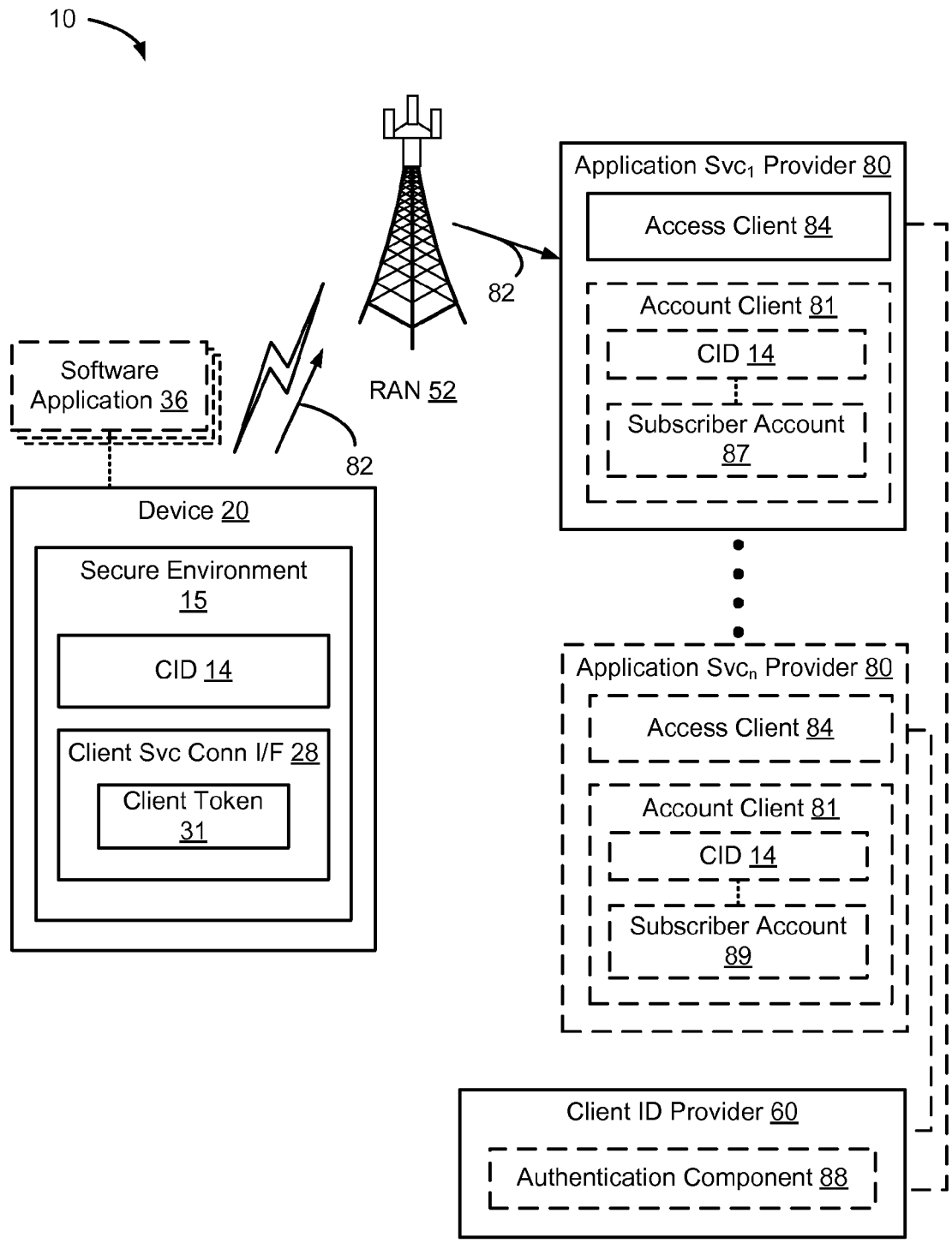
FIG. 6 is a schematic diagram of an aspect of usage of the device-specific client identifier in the system of FIG. 1.

Referring now to FIG. 6, illustrated is an example interaction in communication system 10 for using CID 14 and/or client token 39 in providing application services to device 20. In an aspect, device 20 may launch or interact with one or more applications 36, which interact with client services connection interface 28 to generate a request 82 for services from a corresponding one of any number, n, of application service providers 80. For example, in an aspect, service request 82 may include client token 39, generated based upon CID 14 and parameters/algorithms provided by CIDP 60. As such, client token 39 may be used to identify device 20. Service request 82 may also include an application identifier corresponding to application 36 requesting the service, and an identifier of CIDP 60 such that an application service provider receiving request 82 may know which CIDP to use to verify the authenticity of client token 39 and/or CID 14.

Upon receiving request 82, the application service provider 80, e.g. identified as the application service provider corresponding to application 36 making the request, may have an access client 84 that executes to verify CID 14 and/or client token 39 before providing the requested service to application 36. It should be appreciated that a plurality of verification and/or authentication methods may be used in verifying CID 14 and/or client token 39. In an aspect, access client 84 may verify the CID 14 and/or client token 39 with the associated CIDP 60 before providing service to application 36. For example, application service provider 80 may have an established trust relationship with CIDP 60 such that if CIDP 60 verifies and/or authenticates CID 14 and/or client token 39, application service provider 80 may provide access to device 20 associated with CID 14 based upon the trust relationship established with CIDP 60.

Access client 84 may verify CID 14 either directly or indirectly. For example, in one aspect, application service provider 80 or access client 84 may authenticate CID 14 and/or client token 39, such as by applying a public key of CIDP 60 to request 82 or client token 39 to obtain and validate CID 14. In another aspect, application service provider 80 or access client 84 may authenticate device 20 by forwarding an authentication information request, e.g. including the received CID 14 and/or client token 39 or a portion thereof to the corresponding CIDP 60. CIDP 60 may have an authentication component 88 for receiving the authentication information request and generating corresponding authentication information, e.g. authenticating one or more CIDs 14 and/or client tokens 39 associated with one or more devices 20. If the received CID 14 and/or client token 39 is valid, then CIDP 60 may send a response, e.g. the authentication information, to application service provider 80 authenticating an application services subscriber identity of device 20. If, however, the received CID 14 and/or client token 39 is not valid, CIDP 60 may send a response to application service provider 80 indicating an invalid identification.

Upon verifying the authenticity of CID 14 and/or client token 39, and hence the application services subscriber identity of device 20, application service provider 80 may include an account client 81 that determines whether an application service subscriber account 87 is established for CID 14. If an application service subscriber account 87 has been established, application service provider 80 may use the application service subscriber account 87 associated with CID 14 to provide application services to device 20 and/or application 36. For example, if a user of device 20 has previously established an account with an online service provider that provide electronic book downloads, upon verifying the authenticity of device 20 via the CID 14 and/or client token 39, the online service provider may provide access to the electronic books to device 20 using the account previously established for device 20.

If however, an application service account has not been established for CID 14, account client 81 may initiate an account establishment process to collect subscriber information and setup subscriber account 87. For example, application service provider 80 may request a user of device 20 provide a user name and/or password, contact information, payment information, etc., for associating with application services subscriber account 87.

It should be appreciated that any of the plurality of application service providers 80 associated with a plurality of applications 36 may receive request 82 for services using the CID 14 and/or client token 39 to verify an application services subscriber identity of device 20. Thus, device 20 may use CID 14 and/or client token 39 to access a plurality of application service providers 80 without CID 14 being uniquely associated with each individual application service provider 80. Instead, the application service providers 80 may have a trust relationship with CIDP 60 and use the relationship established with CIDP 60 to authenticate device 20 via CID 14 and/or client token 39. Thus, CID 14 may be associated with a plurality of different application services subscriber accounts, e.g. subscriber account 87 and subscriber account 89, at any number of different application service providers.

Figure 7:
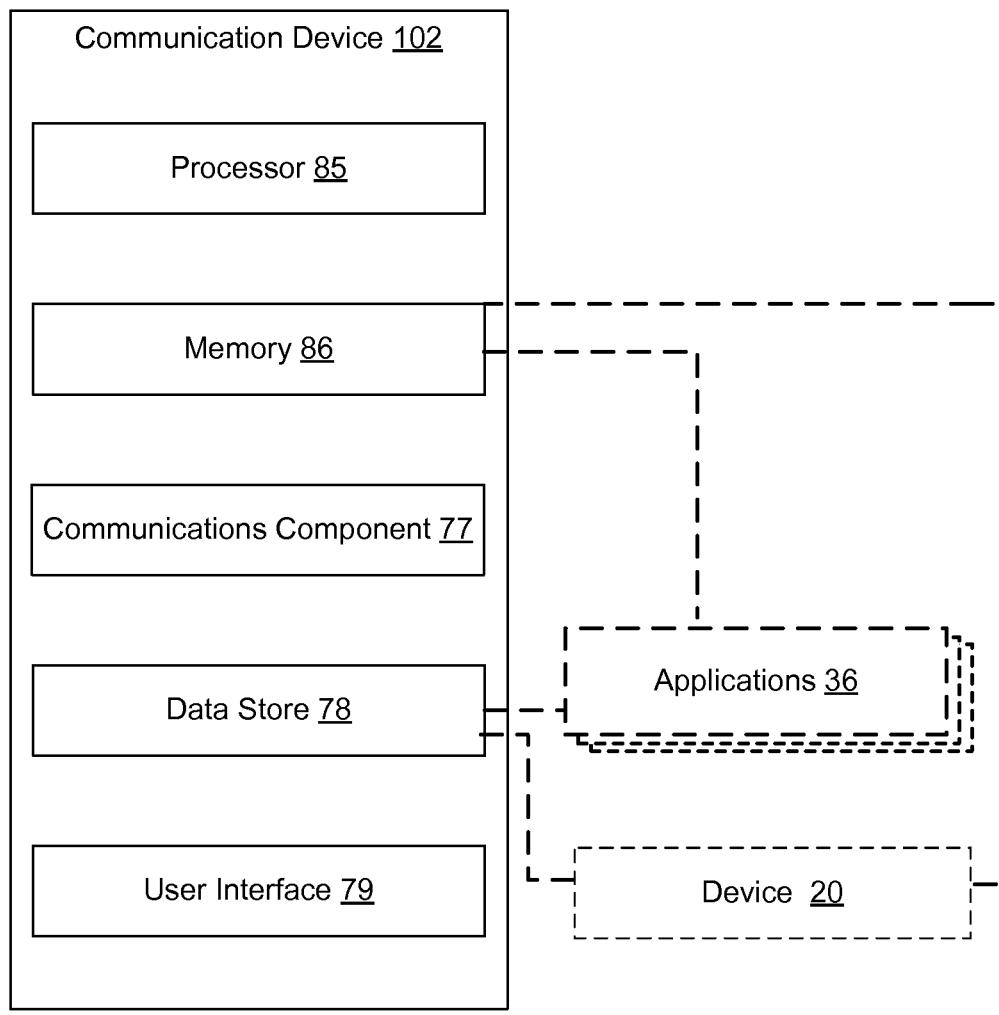
FIG. 7 is a schematic block diagram of an aspect of a communication device, which includes the device of FIG. 1.

Referring now to FIG. 7, illustrated is an example communication device 102 operable within the communication system 10 (FIG. 1) in accordance with an aspect. Communication device 102 may include device 20 (FIG. 1), or communication device 102 may be device 20. For example, device 20 may be a modem or an operating system or a memory card, and thus device 20 is included in communication device 102. Further for example, device 20 may be a cellular telephone, and in an aspect communication device 102 may thus be device 20.

In one aspect, communication device 102 may include a processor 85 for carrying out processing functions associated with one or more of components and functions described herein. Processor 85 can include a single or multiple set of processors or multi-core processors. Moreover, processor 85 can be implemented as an integrated processing system and/or a distributed processing system.

Communication device 102 may further includes a memory 86, such as for storing local versions of applications being executed by processor 85. Memory 86 can include a type of memory usable by a computer, such as random access memory (RAM), read only memory (ROM), tapes, magnetic discs, optical discs, volatile memory, non-volatile memory, and any combination thereof. Memory 86 may be the same as, or may include memory 13 (FIG. 2).

Further, communication device 102 includes a communications component 77 that provides for establishing and maintaining communications with one or more parties utilizing hardware, software, and services as described herein. Communications component 77 may carry communications between components on communication device 102, as well as between communication device 102 and external devices, such as devices located across a communications network and/or devices serially or locally connected to communication device 102. For example, communications component 77 may include one or more buses, and may further include transmit chain components and receive chain components associated with a transmitter and receiver, respectively, operable for interfacing with external devices.

Additionally, communication device 102 may further include a data store 78, which can be any suitable combination of hardware and/or software, that provides for mass storage of information, databases, and programs employed in connection with aspects described herein. For example, data store 78 may be a data repository for applications not currently being executed by processor 85.

Communication device 102 may additionally include a user interface component 79 operable to receive inputs from a user of communication device 102 and further operable to generate outputs for presentation to the user. User interface component 79 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 79 may include one or more output devices, including but not limited to a display, a speaker, a haptic feedback mechanism, a printer, any other mechanism capable of presenting an output to a user, or any combination thereof.

In an aspect, memory 86 and/or data store 78 may include one or more applications 36. In addition, memory 86 and/or data store 78 and/or processor 85 may include device 20. Thus, it should be appreciated that device 20 may be within communication device 102.

Figure 8:
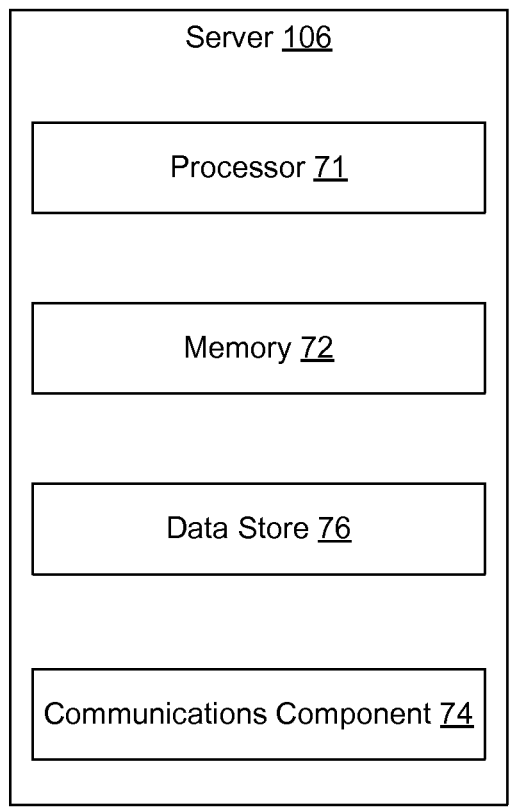
FIG. 8 is a schematic block diagram of a server device that may embody one or more entities in the system of FIG. 1.

Referring now to FIG. 8, illustrated is an example server device 106 operable within communication system 10 (FIG. 1) in accordance with yet another aspect. For example, server device 106 may provide all or a portion of the functionality of any of NIDP 30, network service provider 50, CIDP 60, application service provider 80 and provisioning provider 90 of FIG. 1. Server 106 manages network connectivity matters for access network 104. Server 106 includes processor component 71 for carrying out processing functions associated with one or more of components and functions described herein. Processor component 71 can include a single or multiple set of processors or multi-core processors. Moreover, processing component 71 can be implemented as an integrated processing system and/or a distributed processing system.

Server 106 further includes a memory 72, such as for storing local versions of applications being executed by processor component 71. Memory 72 can include random access memory (RAM), read only memory (ROM), and a combination thereof.

Further, server 106 includes a communications component 74 that provides for establishing and maintaining communications with one or more parties utilizing hardware, software, and services as described herein. Communications component 74 may carry communications between components on server 106, as well as between server 106 and external devices, such as devices located across a communications network and/or devices serially or locally connected to server 106.

Additionally, server 106 may further include a data store 76, which can be any suitable combination of hardware and/or software, that provides for mass storage of information, databases, and programs employed in connection with aspects described herein. For example, data store 76 may be a data repository for applications not currently executing.

Figure 9:
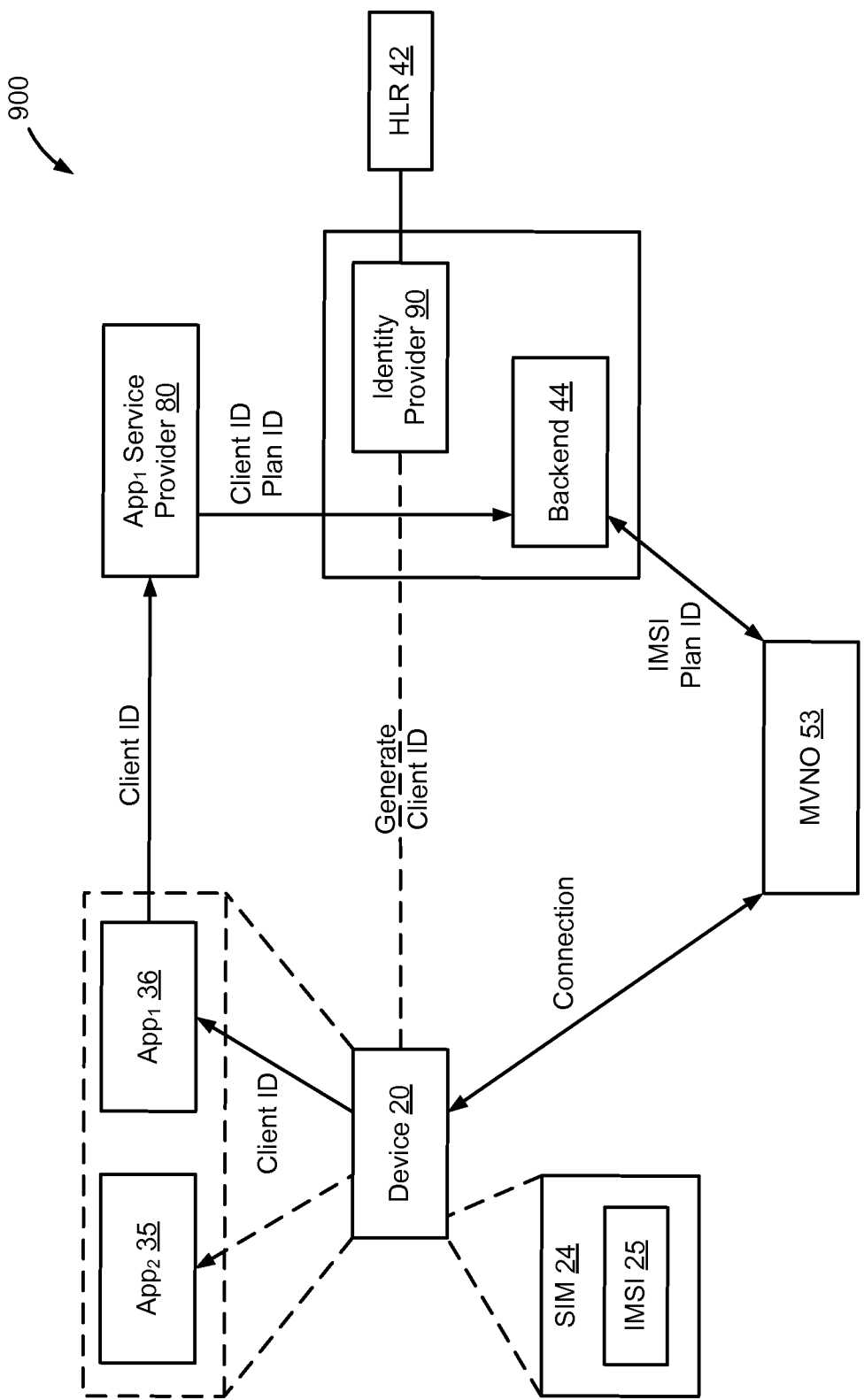
FIG. 9 illustrates an example communication system in accordance with an aspect.

Referring now to FIG. 9, illustrated is a connectivity system 900 in accordance with an aspect. Connectivity system 900 may include device 20 in communication with identity provider 90. Device 20 may launch one or more applications 35, 36 that require data connectivity to access and/or receive services provided by application service provider 80. In an aspect, device 20 may establish an initial connection with MVNO 53, where the connection may be a pinhole connection, so that device 20 may have an initial connection with MVNO 53 to request data connectivity for use with application service provider 80. For example, the pinhole connection may be sponsored data connectivity from application service provider 80 where the application service provider 80 pays for the initial connection with MVNO 53 so that device 20 may receive data connectivity from MVNO 53 to send a service request to application service provider 80. The pinhole connection may also be a default connection where the MVNO 53 allows device 20 to attempt to connect with application service provider 80.

MVNO 53 may authenticate device 20 with HLR 42 before providing data connectivity to device 20. For example, HLR 42 may authenticate the IMSI 25 of device 20. Device 20 may request and receive a client ID from identity provider 90 to use with application 36. Client ID may be an identifier that is unique to application 36 and device 20. Device 20 may forward the client ID to application 36. Application 36 may forward the client ID to application service provider 80, along with any authentication parameters device 20 has for application service provider 80 (e.g., user name and/or password).

Application service provider 80 may perform a look-up to determine the access plan information associated with the received client ID. Application service provider 80 may forward the client ID and the plan ID identifying the access plan information associated with the client ID to backend 44. Backend 44 may communicate with MVNO 53 by forwarding the received plan ID and the IMSI of device 20. Upon receiving the plan ID and IMSI of device 20, MVNO 53 may provide data connectivity to device 20 for access to application service provider based on the data connectivity plan identified by the plan ID.

Figure 10:
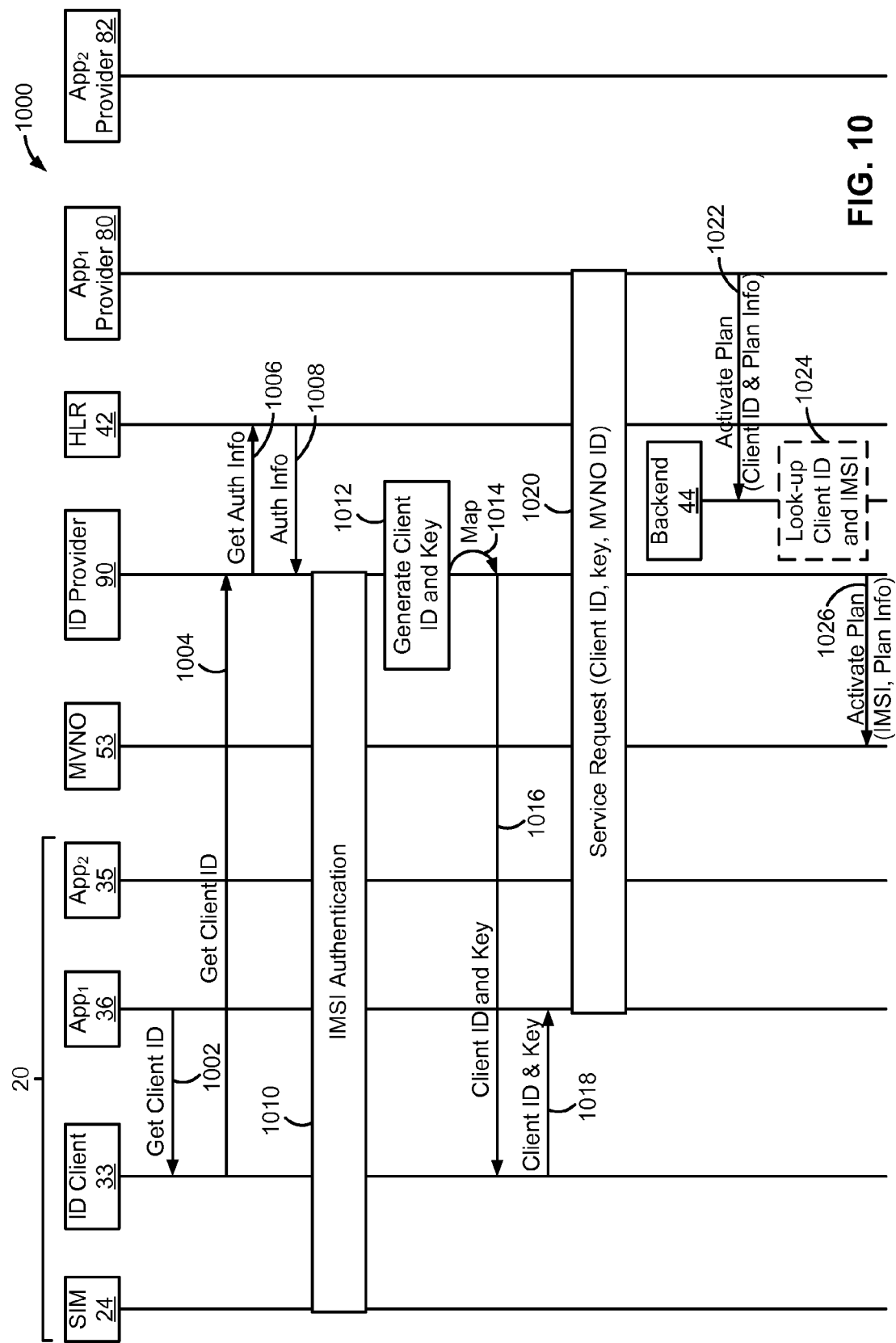
FIG. 10 is a signaling diagram illustrating communication in accordance with an aspect.

Referring now to FIG. 10, illustrated is signaling diagram 1000 for activating a communication plan in accordance with an aspect. Signaling diagram 1000 illustrates an aspect where MVNO 53 is providing communication access to device 20 for use with application service provider 80 based upon a verification of the IMSI associated with device 20.

At 1002, application 36 sends a request to ID client 33 requesting a client ID for application 36. For example, when device 20 launches application 36, device 20 may request a client ID from identity provider 90 to use with application 36.

At 1004, identity provider 90 may receive a client ID request from ID client 33 requesting the client ID for application 36. Next, at 1006, identity provider 90 may communicate with HLR 42 to request authentication information, and at 1008, identity provider 90 may receive the authentication information from HLR 42. The authentication information may be based, for example, on the IMSI of device 20.

At 1010, an IMSI authentication may occur between SIM 24 and identity provider 90 to authenticate device 20 using the authentication information received from HLR 42. Upon identity provider 90 authenticating the IMSI of device 20, at 1012, identity provider 90 may generate a client ID and key for the IMSI of device 20. It should be noted that the client ID may be unique to application 36 and device 20.

At 1014, identity provider 90 may map the generated client ID to the IMSI of device 20 and store the mapping, for example, in an identity data store.

Figure 11:
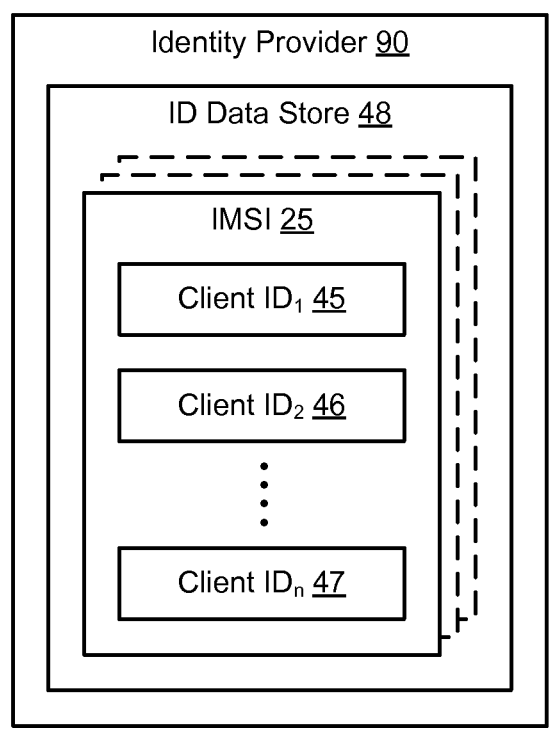
FIG. 11 is an example identity data store in accordance with an aspect.

Referring to FIG. 11, for example, illustrated is an example identity data store 48 of identity provider 90, in accordance with an aspect. Identity data store 48 may include a plurality of IMSIs 25 and for each IMSI 25 included in the identity data store 48, identity provider 90 may map one or more client IDs 45-47 to the respective IMSI 25. It should be noted that for each application accessed by device 20, a different client ID may be associated with each application, and therefore, the IMSI of device 20 may be associated with a plurality of client IDs 45-47 for accessing the respective application service providers. By creating different client IDs to access different application service providers, each application service provider is unaware of the activity occurring at the other application service providers by device 20. Moreover, by having different client IDs to access different application service providers, data cannot be shared between the application service providers regarding the activity of device 20. Thus, privacy is created by segmenting the access to the various application service providers.

Referring back to FIG. 10, at 1016, identity provider 90 may send the client ID and key to ID client 33. At 1018, ID client 33 may forward the client ID and key to application 36.

Next, at 1020, application 36 may send a service request to application service provider 80 requesting service. The service request may include, for example, the client ID and the MVNO ID from ID client 33. It should be noted that the request for service may be for internet connectivity and/or for any service provided by application service provider 80.

At 1022, application service provider 80 may send an activate plan message to backend 44. The activate plan message may include, for example, the client ID and the plan information associated with the client ID. The plan information may include, but is not limited to, parameters identifying the data connection plan (e.g., 100 megabytes of data access) for use with the MVNO associated with the received MVNO ID. In addition, the plan information may include a plan identifier for identifying the data connection plan.

At 1024, backend 44 may perform a look-up to associate the client ID received from application service provider 80 with the appropriate IMSI. For example, backend 44 may access identity data store 48 (FIG. 11) and compare the received client ID with client IDs 45-47 (FIG. 11). When a match occurs, backend 44 may retrieve the IMSI 25 associated with the client ID, e.g., client ID 45, that matches the received client ID from application service provider 80.

Next, at 1026, identity provider 90 may send an activate plan message to MVNO 53. The activate plan message may include, for example, the IMSI of device 20 and the plan information received from application service provider 80. It should be noted that the plan information may include a variety of information that may inform the MVNO 53 of an amount of data access to provide to device 20 for use with application 36.

Figure 12:
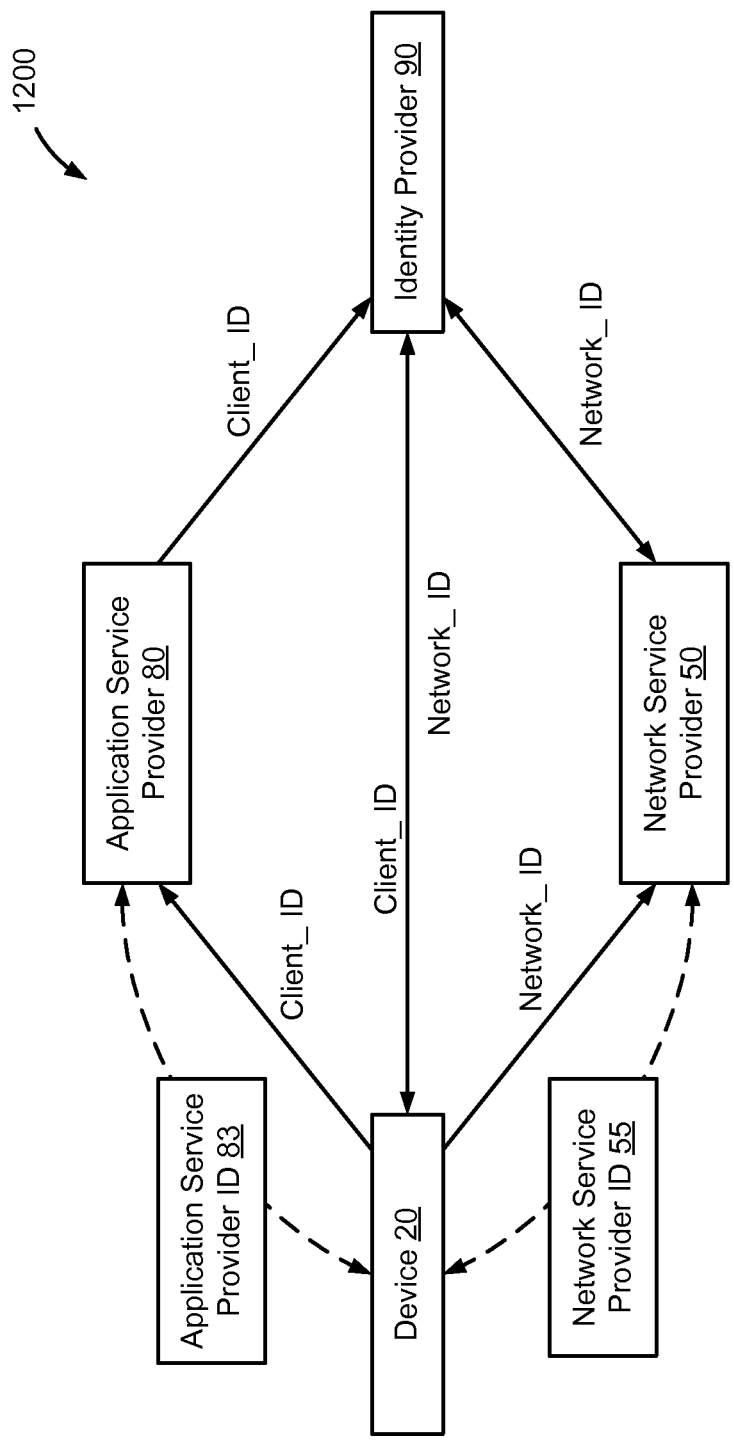
FIG. 12 is an example communication system in accordance with an aspect.

Referring now to FIG. 12, illustrated is an example connectivity system 1200 in accordance with an aspect. Connectivity system 1200 may include device 20 in communication with a network service provider 50, such as a cellular carrier and/or a WiFi access point. In an aspect, device 20 may have a network service provider ID 55 that is unique to the network service provider 50 and allows device 20 to access network service provider 50. Network service provider ID 55 may include, for example, an access code and/or a user name and password. For example, if network service provider 50 is a WiFi access point, the network service provider ID 55 may be a key that allows device 20 to connect to the WiFi access point. In addition, device 20 may have a network ID that is generated by identity provider 90 and identifies device 20 to the network service provider 50. The network service provider 50 may communicate with identity provider 90 using the network ID of device 20.

In an aspect, device 20 may also communicate with application service provider 80. Device 20 may have an application service provider ID 83 that allows device 20 to access application service provider 80 and may identify a subscriber account associated with device 20. Application service provider ID 83 may include, but is not limited to, a user name, a password, an access code, or any combination thereof. In addition, device 20 may request a client ID from identity provider 90 to use when accessing application service provider 80. Device 20 may forward the received client ID to application service provider 80 when requesting access to application service provider 80. The application service provider 80 may forward the client ID to identity provider 90. Identity provider 90 may perform a look up based upon the received client ID, the network ID associated with device 20. Upon determining the correct network ID, identity provider 90 may forward the request for access to application service provider 80 to network service provider 50. Network service provider 50 may provide the requested data connectivity to device 20 for accessing application service provider 80.

Figure 13:
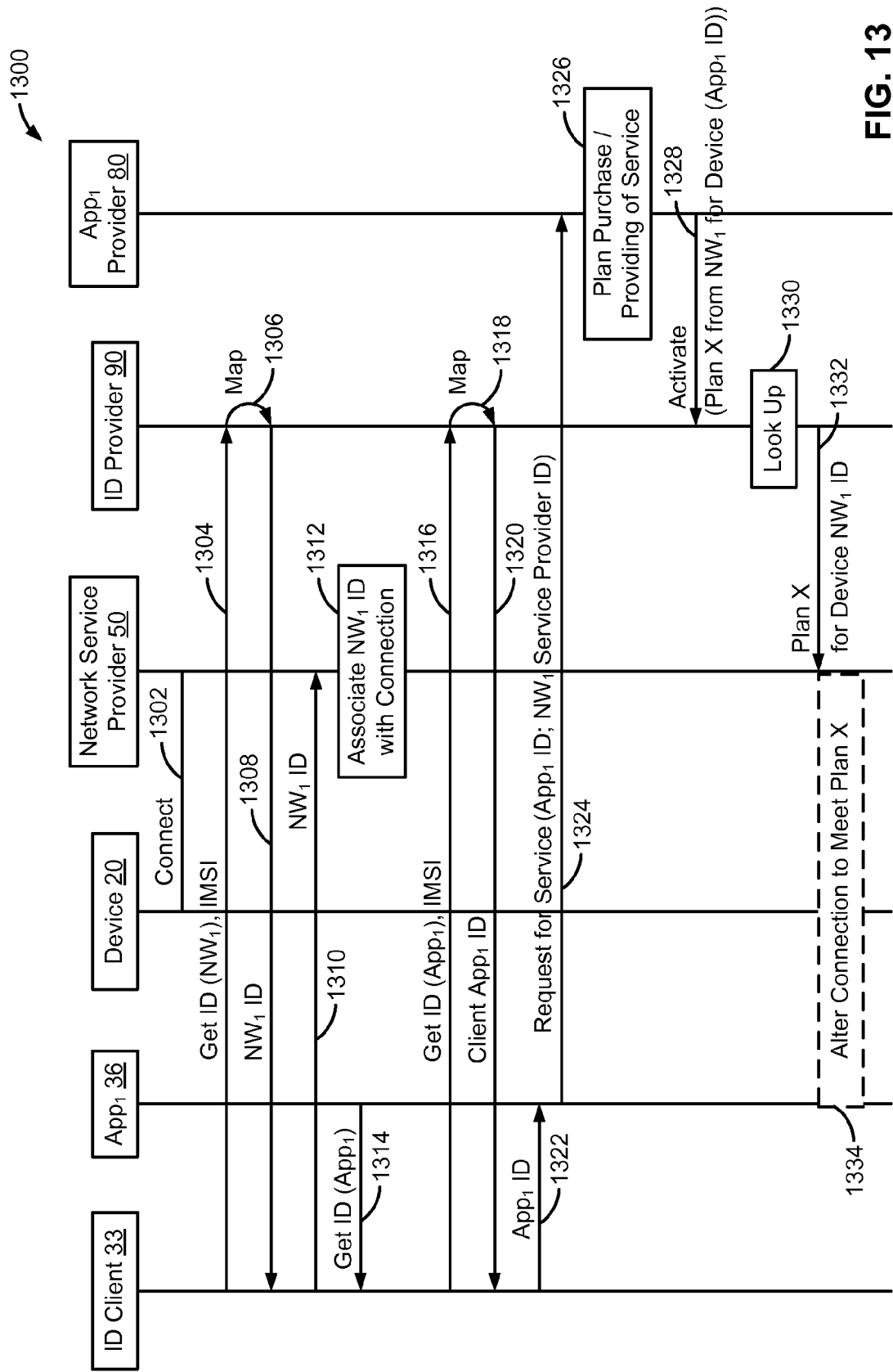
FIG. 13 is a signaling diagram illustrating activating a communication in accordance with an aspect

Referring now to FIG. 13, illustrated is signaling diagram 1300 for activating a communication plan in accordance with an aspect. Signaling diagram 1300 illustrates an aspect where a network service provider 50 is providing communication access to device 20 for use with application service provider 80. It should be noted that device 20 may not need a business relationship, such as a data connectivity plan, with network service provider 50. Instead, device 20 may negotiate with the application service provider 80 to purchase data connectivity from application service provider 80 to use with network service provider 50. Network service provider 50 may include, but is not limited to, a WiFi data access point, a cellular network, and a MVNO.

At 1302, device 20 may connect to network service provider 50. For example, device 20 may have a predefined network selection list indicating which networks device 20 may connect to in order to receive data connectivity. In an aspect, network service provider 50 may be included on the network selection list of device 20, and therefore, device 20 may connect to network service provider 50 using information provided in the network selection list. In addition, device 20 may discover which networks are near device 20 that may provide data connectivity. For example, network service provider 50 may be near device 20 and a component on device 20 may discover network service provider 50 and that network service provider 50 has data connectivity available.

In an aspect, the initial connection with network service provider 50 may be a pinhole connection allowing device 20 to have an initial connection with network service provider 50 to request service from application service provider 80. Network service provider 50 may allow device 20 to connect to network service provider 50 without a data plan in order to allow traffic destined for application service provider 80 to pass through network service provider 50. For example, the pinhole connection may be sponsored data connectivity from application service provider 80. Application service provider 80 may pay for initial connections with network service provider 50, and therefore, allowing device 20 to receive an initial data connection from network service provider 50 to send a service request to application service provider 80. The pinhole connection may also be a default connection where network service provider 50 allows device 20 to attempt to connect with application service provider 80. Therefore, device 20 may not need a business relationship with network service provider 50. Instead, network service provider 50 may have a relationship with identity provider 90 so that device 20 may access network service provider 50 without having a business relationship with network service provider 50.

At 1304, the ID client 33 may forward a network ID request message to Identity provider 90 for the network ID associated with network service provider 50. The network ID request message may include network identification information, such as a name of network service provider 50. In addition, the network ID request message may also include the IMSI of device 20. Thus, identity provider 90 may use the network ID request to identify device 20 and the network service provider 50 that device 20 is currently connected with.

Next, at 1306, identity provider 90 may generate the network ID for network service provider 50 for device 20 and map the generated network ID to the received IMSI of device 20. It should be noted that the network ID generated by identity provider 90 may be unique to the connection of device 20 with network service provider 50. At, 1308, identity provider 90 may forward the generated network ID to ID client 33. In an aspect, identity provider 90 may also store the generated network ID in an identity data store 49 (FIG. 14).

Figure 14:
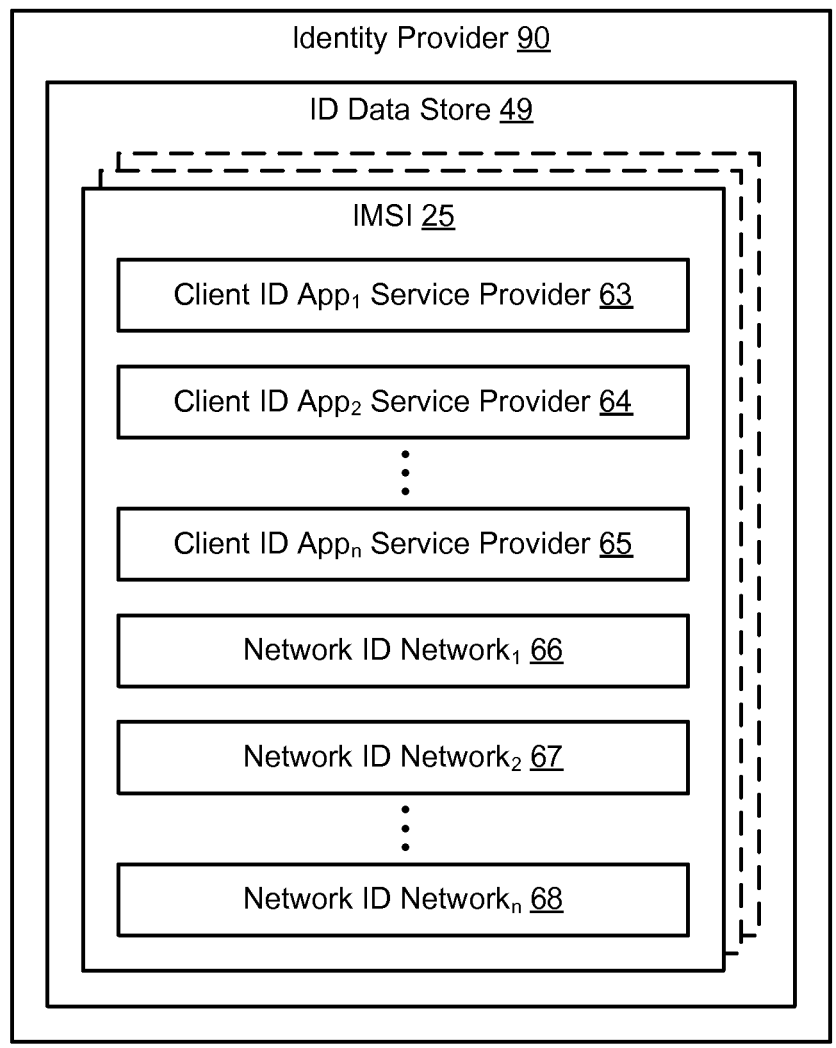
FIG. 14 is an example identity data store in accordance with an aspect.

Referring now to FIG. 14, illustrated is an example identity data store 49 in accordance with an aspect. Identity data store 49 may include a plurality of IMSIs 25, with each IMSI associated with a device. For each IMSI 25 included in the identity data store 49, identity provider 90 may map one or more client IDs 63-65 and/or one or more network IDs 66-68 to the IMSI 25. By mapping the identifiers to the IMSI, all identifiers that are associated with the same device will point to the same IMSI. In addition, by mapping the identifiers to the IMSI, the identifiers of a device may indirectly map to other IDs that are associated with the same device.

Referring back to FIG. 13, in an aspect, identity provider 90 may compare the received IMSI of device 20 and the received network information of network service provider 50 to the information stored in identity data store 49 (FIG. 14). When a match occurs identity provider 90, at 1308, may forward the network ID to ID client 33.

At, 1310, network service provider 50 may receive the network ID from ID client 33, and at 1312, network service provider 50 may associate the network ID with the connection provided to device 20. Thus, while network service provider 50 may not know the IMSI of device 20, network service provider 50 may identify device 20 through the network ID associated with device 20.

At 1314, application 36 may send a request to ID client for the client application ID associated with application 36. For example, a different client application ID may be used for each application 36 used by device 20.

Next, at 1316, identity provider 90 may receive a request for the client application ID associated with application 36. The request for the client application ID may include application information that identifies application 36 to identity provider 90 and the IMSI of device 20.

At 1318, identity provider 90 may generate the client application ID associated with application 36 for device 20. At 1318, identity provider 90 may send the client application ID to ID client 33. In addition, identity provider 90 may also store the generated client application ID in a data store, such as identity data store 49 (FIG. 14).

In an aspect, identity provider 90 may compare the received IMSI and the application information for application 36 with the information stored, for example, in identity data store 49 (FIG. 14). When a match occurs, at 1320, identity provider 90 may, at 1318, send the client application ID that matches the information for application 36 and the IMSI to ID client 33.

Next, at 1322, ID client 33 may send the received client application ID to application 36. At 1324, application 36 may send a request for service to application service provider 80. The request for service may include the client application ID and a network service provider identification so that the request for service may identify the application 36 and the network service provider 50 to the application service provider 80. The request for service may also include an application service provider ID that allows a user of device 20 to gain access to the application service provider 80 and/or identifies the user to the application service provider. For example, the application service provider ID may be a user name and/or password that may provide access to a subscriber account associate with the user of device 20. The application service provider 80 may use the application service provider ID to associate the account of the user of device 20 with the client application ID and the network service provider information. It should be noted that the request for service may be for internet connectivity and/or any service provided by application service provider 80.

At 1326, application service provider 80 may determine the purchase plan and/or services to provide to device 20 based on the received network service provider ID, the application ID and/or the information identifying the network service provider 50. In an aspect, applicant service provider 80 may determine that a data connectivity plan exists between the user of device 20 and application service provider 80 to use with the application associated with application ID. For example, the user of device 20 may have paid application service provider 80 for data connectivity to access the services provided by application service provider 80.

In an aspect, application service provider 80 may determine that the user of device 20 may need to purchase data connectivity in order to receive the services provided by application service provider 80. For example, the user of device 20 may not have a pre-established data connectivity plan for accessing the services provided by application service provider 80 and may negotiate with application service provider 80 to purchase data connectivity to use with network service provider 50. In an aspect, application service provider 80 and network service provider 50 may have pre-established a data plan rate at which the user of device 20 may purchase data connectivity.

In another aspect, application service provider 80 may sponsor the entire data connectivity and/or a portion of the data connectivity with network service provider 50. For example, application service provider 80 may pay for the data connectivity with network service provider 50 for use with the services provided by application service provider 80. Thus, when device 20 launches application 36 to access a service provided by application service provider 80, application service provider 80 may pay for the entire data connectivity for using the requested service.

At 1328, application service provider 80 may send an activate plan message to identity provider 90. The activate plan message may include, for example, the plan information for application 36 on device 20 using data connectivity provided by network service provider 50.

Next, at 1330, identity provider 90 may perform a lookup to determine the network ID associated with the received network information from the application service provider 80. In an aspect, identity provider 90 may compare the received network information a data store of identities, such as identity data store 49 (FIG. 14). When a match occurs, identity provider 90, at 1332, may forward the plan information, device ID, and network ID to network service provider 50.

At 1334, network service provider 50 may alter the connection with application 36 to meet the received data plan from identity provider 90.

In one use case, the user of device 20 may want to purchase an electronic book from application service provider 80 and may have a data connectivity plan with application service provider 80 that allows unlimited data connectivity for purchasing and/or downloading electronic books from application service provider 80. In addition, device 20 may have an initial connection with network service provider 50 which allows device 20 to send a request to purchase an electronic book to application service provider 80. Upon the application service provider 80 receiving the request to purchase the electronic book and accessing the account associated with the user of device 20, the application service provider 80 may determine that device 20 should received data connectivity to purchase the electronic book. Application service provider may send an active plan message to identity provider 90 to active the corresponding data connectivity plan for device 20 to use with network service provider 50. Identity provider 90 may perform a lookup based upon the received activation plan to determine the network ID associated with device 20 and may forward the received data connectivity plan for device 20 and network Id for device 20 to network service provider 50. Network service provider 50 may alter the data connection with device 20 in accordance with the data connectivity plan received from identity provider 90.

Figure 15:
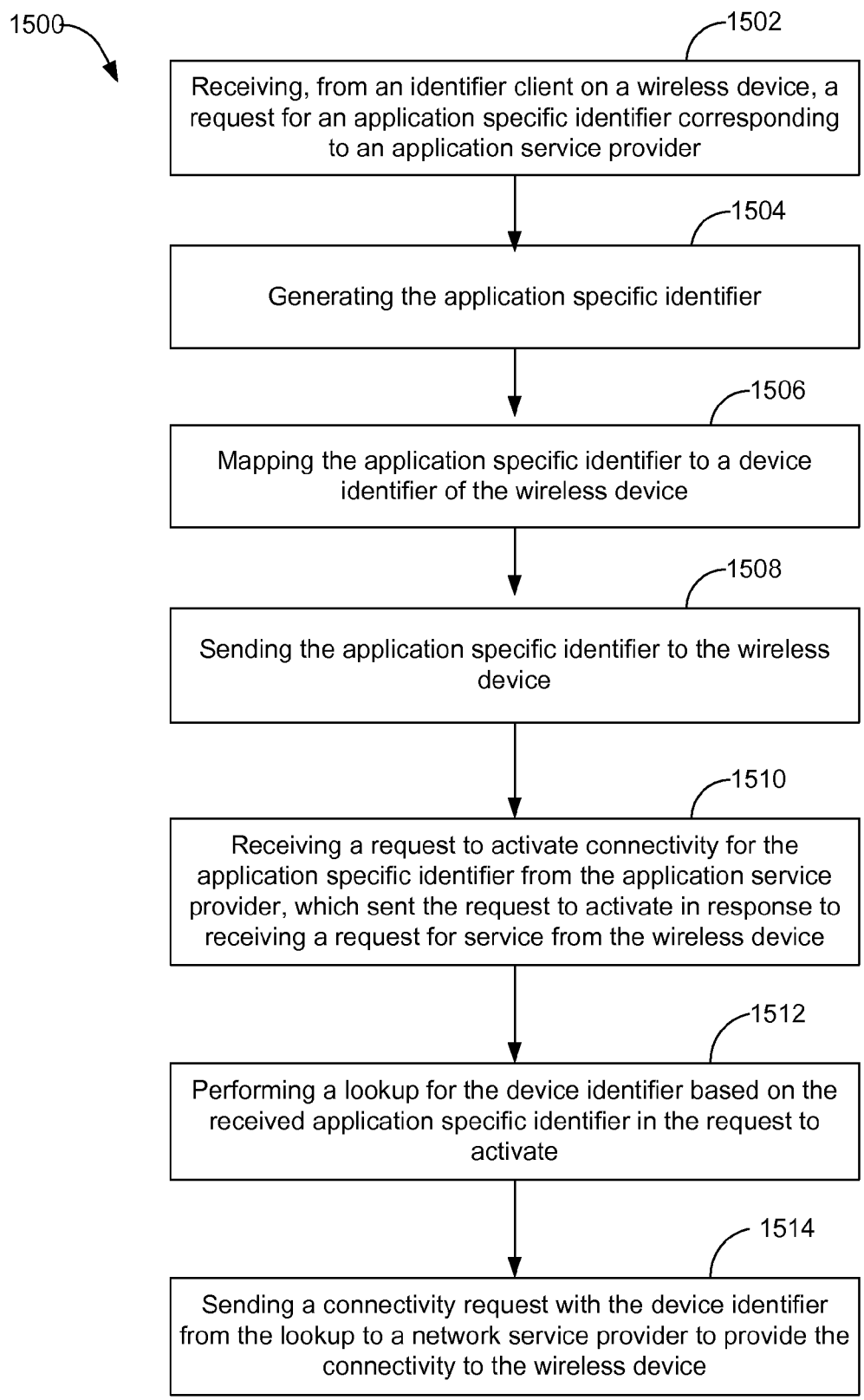
FIG. 15 is a flow chart illustrating a method of communication in accordance with an aspect.

Referring now to FIG. 15, a method 1500 for communication in accordance with an aspect includes, at 1502, receiving, from an identifier (ID) client on a wireless device, a request for an application specific identifier corresponding to an application service provider. For example, in an aspect, identity provider 90 (FIG. 10) may receive a request for an application specific identifier, e.g., client ID for application 36 (FIG. 10), from identity (ID) client 33 (FIG. 10). The request for the application specific identifier may also include a device identifier, such as an international mobile subscriber identity (IMSI) of the device 20 (FIG. 10). In addition, the method may include performing an IMSI authentication with a subscriber identity module (SIM) of the wireless device. For example, identity provider 90 may authenticate the IMSI of device 20 with the SIM of device 20.

In an optional aspect, the method may further include receiving a request for a network specific identifier from the ID client on the wireless device, and sending the network specific identifier to the ID client. For example, identity provider 90 may receive a request for a network specific identifier from ID client 33, and identity provider 90 may send the network specific identifier to ID client 33.

At 1504, the method may include generating the application specific identifier. For example, identity provider 90 may generate the application specific identifier for device 20. It should be noted that the application specific identifier may be unique to device 20 and application 36, and therefore, device 20 may be identified and/or authenticated using the application specific identifier.

Next, at 1506, the method may include mapping the application specific identifier to a device identifier of the wireless device. For example, identity provider 90 may associate the application specific identifier to the IMSI of device 20. In an aspect, identity provider 90 may also store the association of the application specific identifier and the IMSI in a data store. In addition, the identity provider 90 may also map the network specific identifier to the IMSI of device 20 and store the mapping of the network specific identifier and the IMSI in a data store. At, 1508, the method may also include sending the application specific identifier to the wireless device. Identity provider 90 may forward the application specific identifier to ID client 33.

At 1510, the method may further include receiving a request to activate connectivity for the application specific identifier from the application service provider, which sent the request to activate in response to receiving a request for service from the wireless device. For example, identity provider 90 may receive a request to activate connectivity from application service provider 80 (FIG. 1). The request to activate may include a data connectivity plan for device 20 to use with a network service provider 50 (FIG. 1) and/or a MNVO 53 (FIG. 10). In an aspect, the request to activate may include the network service provider information that identifies network service provider 50.

In addition, at 1512, the method may include performing a lookup for the device identifier based on the received application specific identifier in the request to activate. For example, identity provider 90 may look up the IMSI of device 20 based upon the application specific identifier and/or the network service provider information.

At 1514, the method may include sending a connectivity request with the device identifier from the lookup to a network service provider to provide the connectivity to the wireless device. In an aspect, identity provider 90 may send a connectivity request to MVNO 53 with the device identifier for device 20. The connectivity request may include data connectivity plan information corresponding to the data connectivity received from application service provider 80. Identity provider 90 may also send the connectivity request to network service provider 50 (FIG. 13) and the connectivity request may include the specific network ID associated with network service provider 50 and device 20.

Figure 16:
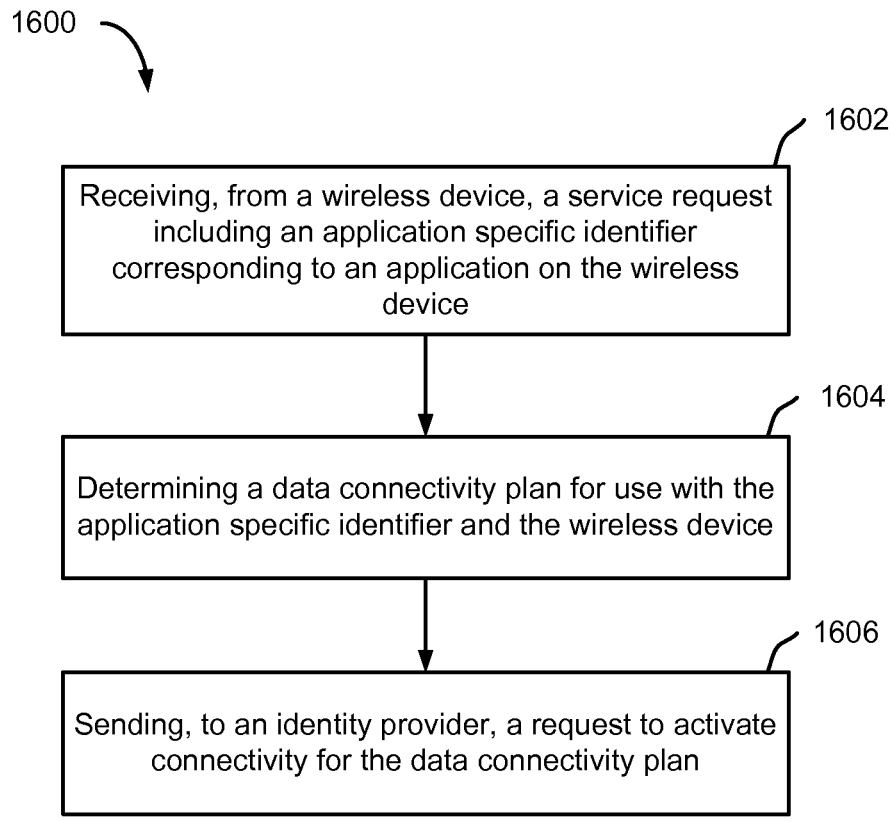
FIG. 16 is a flow chart illustrating a method for providing services in accordance with an aspect.

Referring now to FIG. 16, a method 1600 for providing services in accordance with an aspect includes, at 1602, receiving, from a wireless device, a service request including an application specific identifier corresponding to an application on the wireless device. For example, an application 36 (FIG. 2) executing via device 20 (FIG. 2) may send a service request to application service provider 80 (FIG. 1). The service request may be for internet connectivity and/or any other service provided by the application service provider. In an aspect, the service request may include an application specific identifier, e.g., client ID for the application. In addition, the service request may include an MVNO ID identifying MVNO 53 (FIG. 10) for providing the data connectivity to device 20. In another aspect, the service request may include network service provider information identifying, for example, network service provider 50 (FIG. 1) for providing the data connectivity to device 20.

It should also be noted that the service request may further include an application service provider ID that accesses a subscriber account associated with the user of device 20. For example, the application service provider ID may be a user name and/or password.

At 1604, the method may also include determining a data connectivity plan for use with the application specific identifier and the wireless device. For example, the application service provider 80 may determine a data connectivity plan for use with the application specific identifier, device 20 and/or network service provider 50. In an aspect, application service provider 80 may access the subscriber account associated with the application service provider ID received in the service request. The application service provider may determine whether the subscriber account includes pre-paid data connectivity for the services provided by application service provider. When the subscriber account includes pre-paid data connectivity, the application service provider may associate the pre-paid data connectivity to the data connectivity plan for use with the application specific identifier and the wireless device.

When the subscriber account does not include pre-paid data connectivity, the application service provider may prompt a user of device 20 to purchase data connectivity. The application service provider may apply the purchased data connectivity to the data connectivity plan to use with the application specific identifier and the wireless device.

In an aspect, the application service provider may determine whether sponsored data connectivity is available for use with the application specific identifier and the wireless device. Sponsored data connectivity may include data connectivity that is partially paid for and/or entirely paid for by the application service provider and/or another third party. When sponsored data connectivity is available, the application service provider may apply the sponsored data connectivity to the data connectivity plan. It should be noted that when the sponsored data connectivity partially pays for the data connectivity, the application service provider may apply pre-paid data connectivity from a subscriber's account to cover the remaining cost of the data connectivity and/or prompt a user to purchase the remaining cost of the data connectivity.

Next, at 1606, the method may include sending, to an identity provider, a request to activate connectivity for the data connectivity plan. For example, the application service provider 80 may send a request to activate connectivity to identity provider 90. The request to activate connectivity may include, for example, the application specific identifier, the data connectivity plan and/or data connectivity plan information identifying the data connectivity plan. In addition, the request to activate connectivity may include network service provider information identifying, for example, network service provider 50 for providing the data connectivity to device 20.

Figure 17:
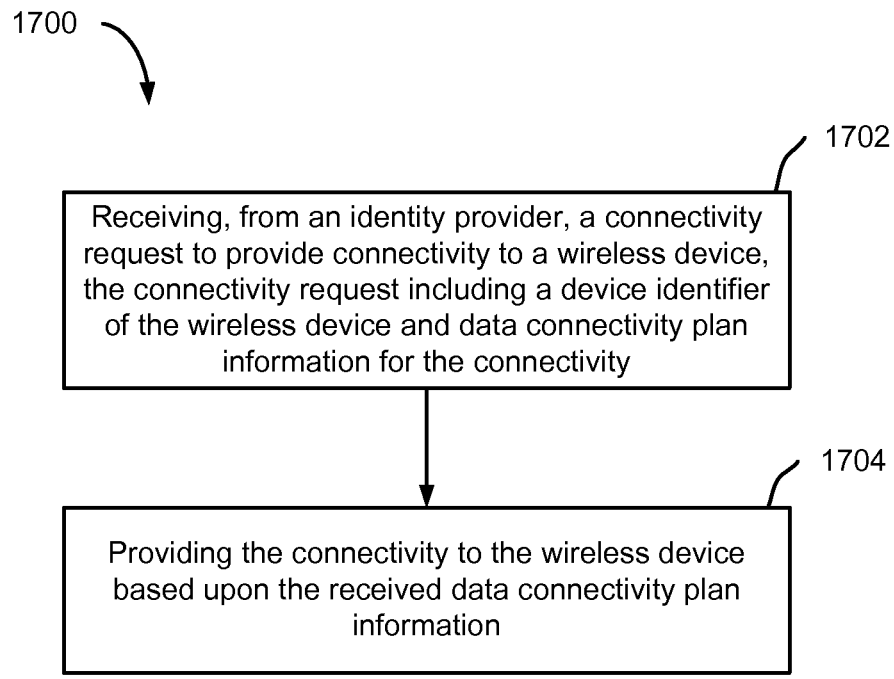
FIG. 17 is a flow chart illustrating a method for providing data connectivity in accordance with an aspect.

Referring now to FIG. 17, a method 1700 for providing data connectivity in accordance with an aspect includes, at 1702, receiving, from an identity provider, a connectivity request to provide connectivity to a wireless device, the connectivity request including a device identifier of the wireless device and data connectivity plan information for the connectivity. In an aspect, MVNO 53 (FIG. 10) may receive a connectivity request from identity provider 90 (FIG. 1) to provide connectivity to device 20 (FIG. 1). The connectivity request may include, for example, a device identifier, such as an IMSI of device 20 and data connectivity plan information for the requested connectivity.

In another aspect, network service provider 50 (FIG. 1) may receive a connectivity request from identity provider 90 to provide connectivity to device 20. The connectivity request may include, for example, a network ID associated with device 20 and the data connectivity plan for the requested connectivity. In an aspect, the network service provider 50 may have previously received the network ID from device 20 and associated an initial connection with device 20 to the received network ID.

In addition, at 1704, the method may include providing the connectivity to the wireless device based upon the received data connectivity plan information. For example, MVNO 53 and/or network service provider 50 may provide the requested data connectivity to device 20 in accordance with the data connectivity plan information and/or the data connectivity plan received from identity provider 90.

In an optional aspect, an initial connection may be established between device 20 and MVNO 53 and/or network service provider 90. It should be noted that device 20 may not have a business relationship (e.g., a data connectivity plan) with MVNO 53 and/or network service provider 90. Thus, the initial connection may be a pinhole connection that allows device 20 to send a service request to application service provider 80 and negotiate a data connectivity plan with application service provider 80 for use with MVNO 53 and/or network service provider 90.

Figure 18:
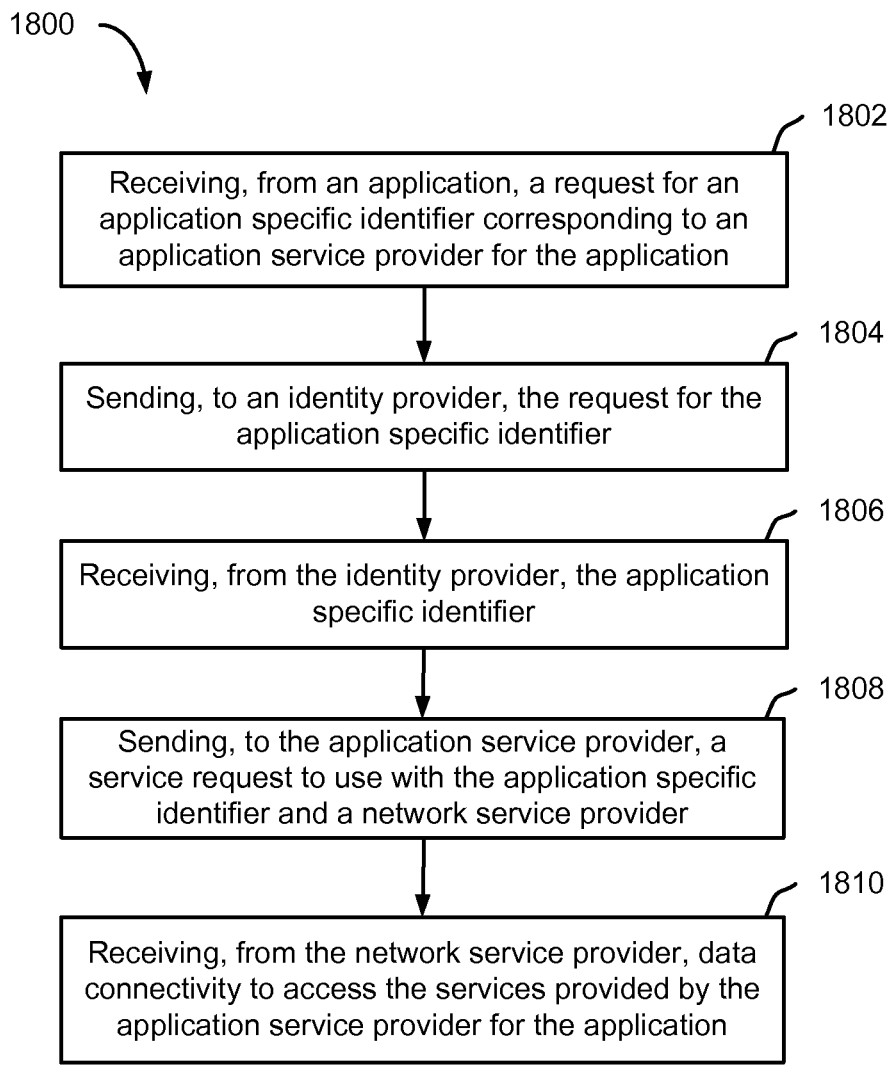
FIG. 18 is a flow chart illustrating a method for communication in accordance with an aspect.

Referring now to FIG. 18, a method 1800 for communication in accordance with an aspect, includes at 1802, receiving, from an application, a request for an application specific identifier corresponding to an application service provider for the application. For example, application 36 (FIG. 10) may send a request for an application specific identifier to an identifier (ID) client 33 (FIG. 10). The application specific identifier may correspond to application 36 on device 20 (FIG. 1).

At 1804, the method may also include sending, to an identity provider, the request for the application specific identifier. For example, ID client 33 may forward the request for the application specific identifier to an identity provider 90 (FIG. 1). The request for the application specific identifier may also include, for example, a device identifier, such as an IMSI of device 20.

Next, at 1806, the method may include receiving, from the identity provider, the application specific identifier. For example, identity provider 90 may send the application specific identifier (e.g., client ID for the application 36) to ID client 33. ID client 33 may forward the received application specific identifier to application 36.

In an optional aspect, the method may further include sending a request for a network specific identifier to the identity provider, and receiving from the identity provider the network specific identifier. For example, ID client 33 may send a request for a network specific identifier to identity provider 90, and ID client 33 may receive the network specific identifier from identity provider 90. In addition, the method may include sending the network specific identifier to a network service provider. For example, ID client 33 may send the network specific identifier to network service provider 50 (FIG. 1).

At 1808, the method may further include sending, to the application service provider, a service request to use with the application specific identifier and a network service provider. The service request may be for internet connectivity and/or for any services provided by the application service provider. For example, application 36 may send a service request to application service provider 80. The service request may include, for example, application specific identifier (e.g., client ID for the application) and the MVNO ID.

In addition, the service request may also include network service provider information identifying the network service provider.

In addition, at 1810, the method may include receiving, from the network service provider, data connectivity to access the services provided by the application service provider for the application. For example, application 36 may receive the data connectivity from MVNO 53 to access the services provided by application service provider.

Figure 19:
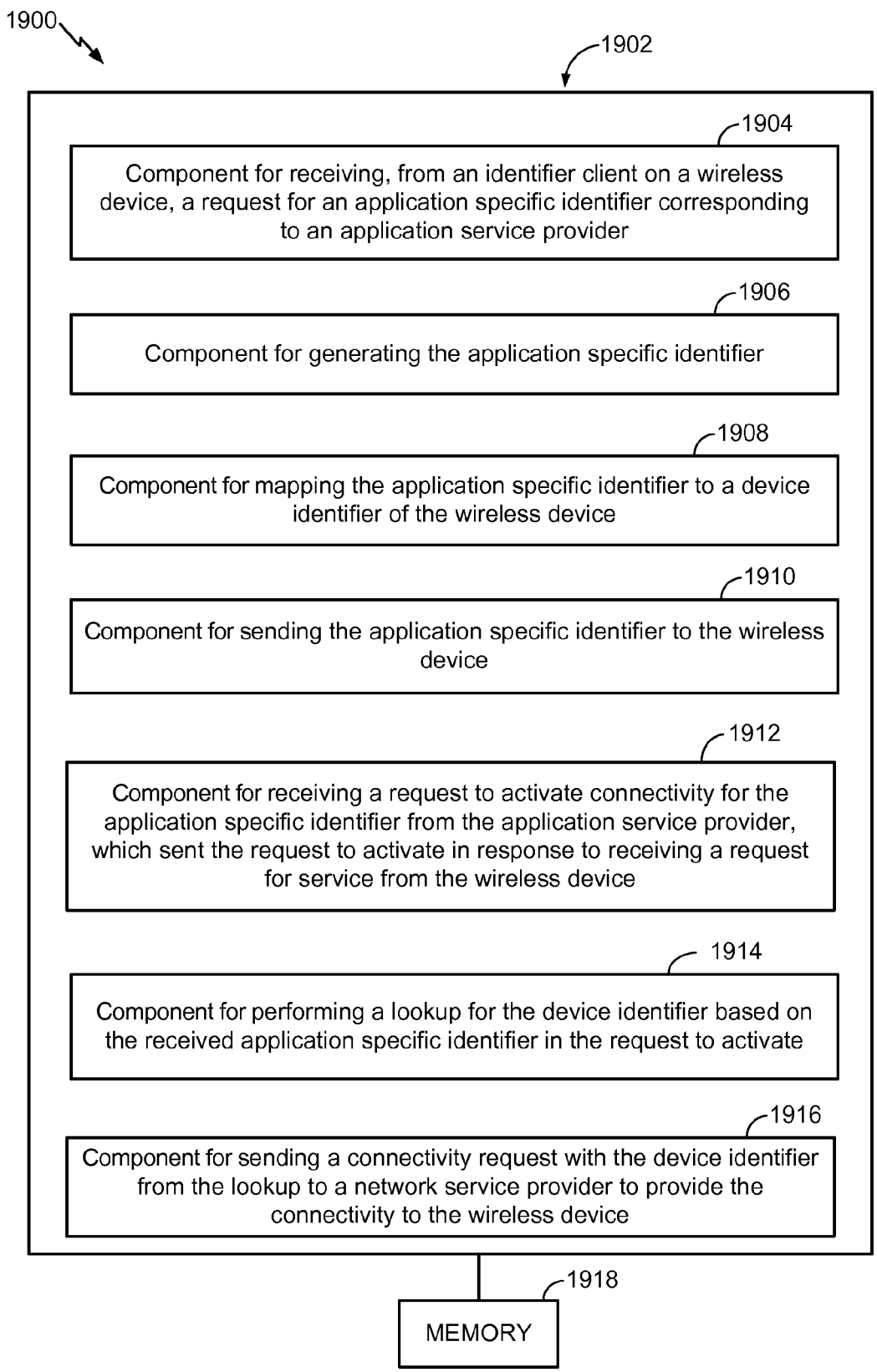
FIG. 19 is an example system that facilitates communication in accordance with an aspect.

Referring now to FIG. 19, illustrated is a system 1900 configured for communication. For example, system 1900 can reside at least partially within a transmitter, mobile device, etc. It is to be appreciated that system 1900 is represented as including functional blocks, which can be functional blocks that represent functions implemented by a processor, software, or combination thereof (e.g., firmware). System 1900 includes a logical grouping 1902 of electrical components that facilitate communication. For instance, logical grouping 1902 may include component 1904 for receiving, from an identifier client on a wireless device, a request for an application specific identifier corresponding to an application service provider. Further, logical grouping 1902 may comprise component 1906 for generating the application specific identifier. In addition, logical grouping 1902 may include component 1908 for mapping the application specific identifier to a device identifier of the wireless device. Logical grouping 1902 may also include component 1910 for sending the application specific identifier to the wireless device. Moreover, logical grouping 1902 may comprise component 1912 for receiving a request to activate connectivity for the application specific identifier from the application service provider, which sent the request to activate in response to receiving a request for service from the wireless device. Logical grouping 1902 may also include component 1914 for performing a lookup for the device identifier based on the received application specific identifier in the request to activate. Logical grouping 1902 may further include component 1916 for sending a connectivity request with the device identifier from the lookup to a network service provider to provide the connectivity to the wireless device. Additionally, system 1900 can include a memory 1918 that retains instructions for executing functions associated with electrical components 1904, 1906, 1908, 1910, 1912, 1914, and 1916. While shown as being external to memory 1918, it is to be understood that one or more of electrical components 1904, 1906, 1908, 1910, 1912, 1914, and 1916 can exist within memory 1914.

Figure 20:
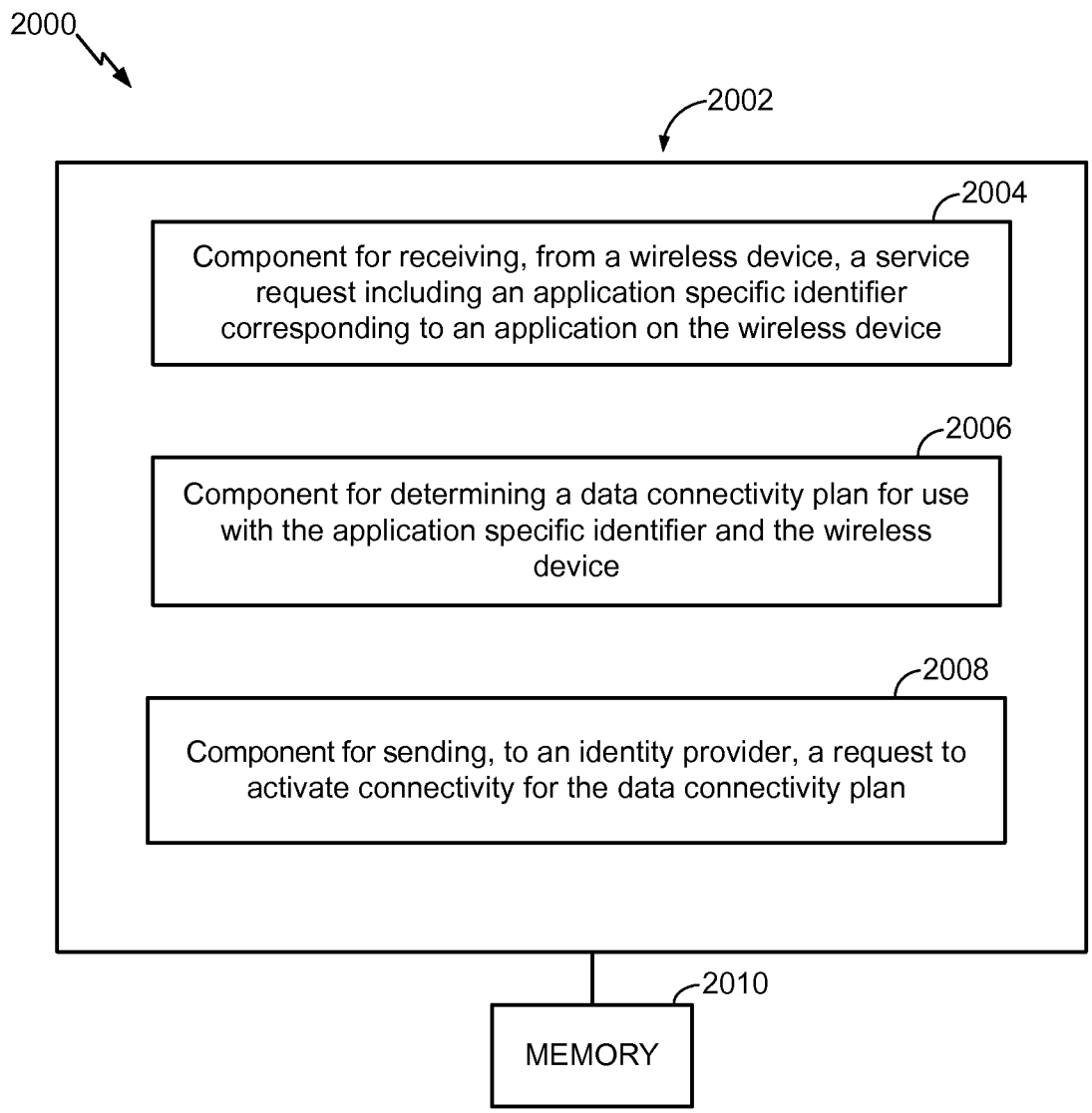
FIG. 20 is an example system that facilitates providing services in accordance with an aspect.

Referring now to FIG. 20, illustrated is a system 2000 configured for providing services. For example, system 2000 can reside at least partially within a transmitter, mobile device, etc. It is to be appreciated that system 2000 is represented as including functional blocks, which can be functional blocks that represent functions implemented by a processor, software, or combination thereof (e.g., firmware). System 2000 includes a logical grouping 2002 of electrical components that facilitate providing services. For instance, logical grouping 2002 may include component 2004 for receiving, from a wireless device, a service request including an application specific identifier corresponding to an application on the wireless device. Further, logical grouping 2002 may comprise component 2006 for determining a data connectivity plan for use with the application specific identifier and the wireless device. In addition, logical grouping 2002 may include component 2008 for sending, to an identity provider, a request to activate connectivity for the data connectivity plan. Additionally, system 2000 can include a memory 2010 that retains instructions for executing functions associated with electrical components 2004, 2006, and 2008. While shown as being external to memory 2010, it is to be understood that one or more of electrical components 2004, 2006, and 2008 can exist within memory 2010.

Figure 21:
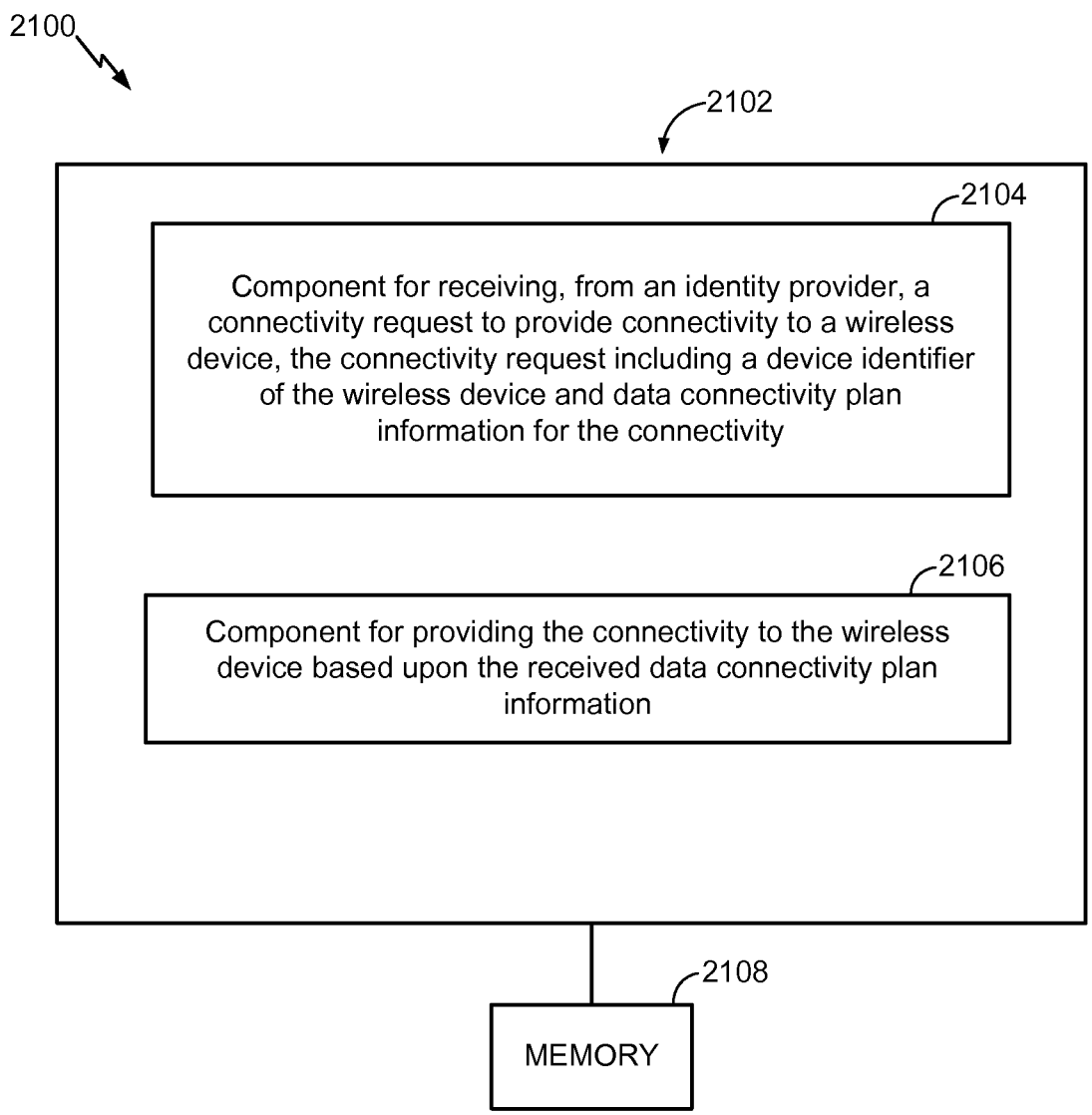
FIG. 21 is an example system that facilitates providing data connectivity in accordance with an aspect.

Referring now to FIG. 21, illustrated is a system 2100 configured for providing data connectivity. For example, system 2100 can reside at least partially within a transmitter, mobile device, etc. It is to be appreciated that system 2100 is represented as including functional blocks, which can be functional blocks that represent functions implemented by a processor, software, or combination thereof (e.g., firmware). System 2100 includes a logical grouping 2102 of electrical components that facilitate subscription management. For instance, logical grouping 2102 may include component 2104 for receiving, from an identity provider, a connectivity request to provide connectivity to a wireless device, the connectivity request including a device identifier of the wireless device and data connectivity plan information for the connectivity. Further, logical grouping 2102 may comprise component 2106 for providing the connectivity to the wireless device based upon the received data connectivity plan information. Additionally, system 2100 can include a memory 2108 that retains instructions for executing functions associated with electrical components 2104 and 2106. While shown as being external to memory 2108, it is to be understood that one or more of electrical components 2104 and 2106 can exist within memory 2108.

Figure 22:
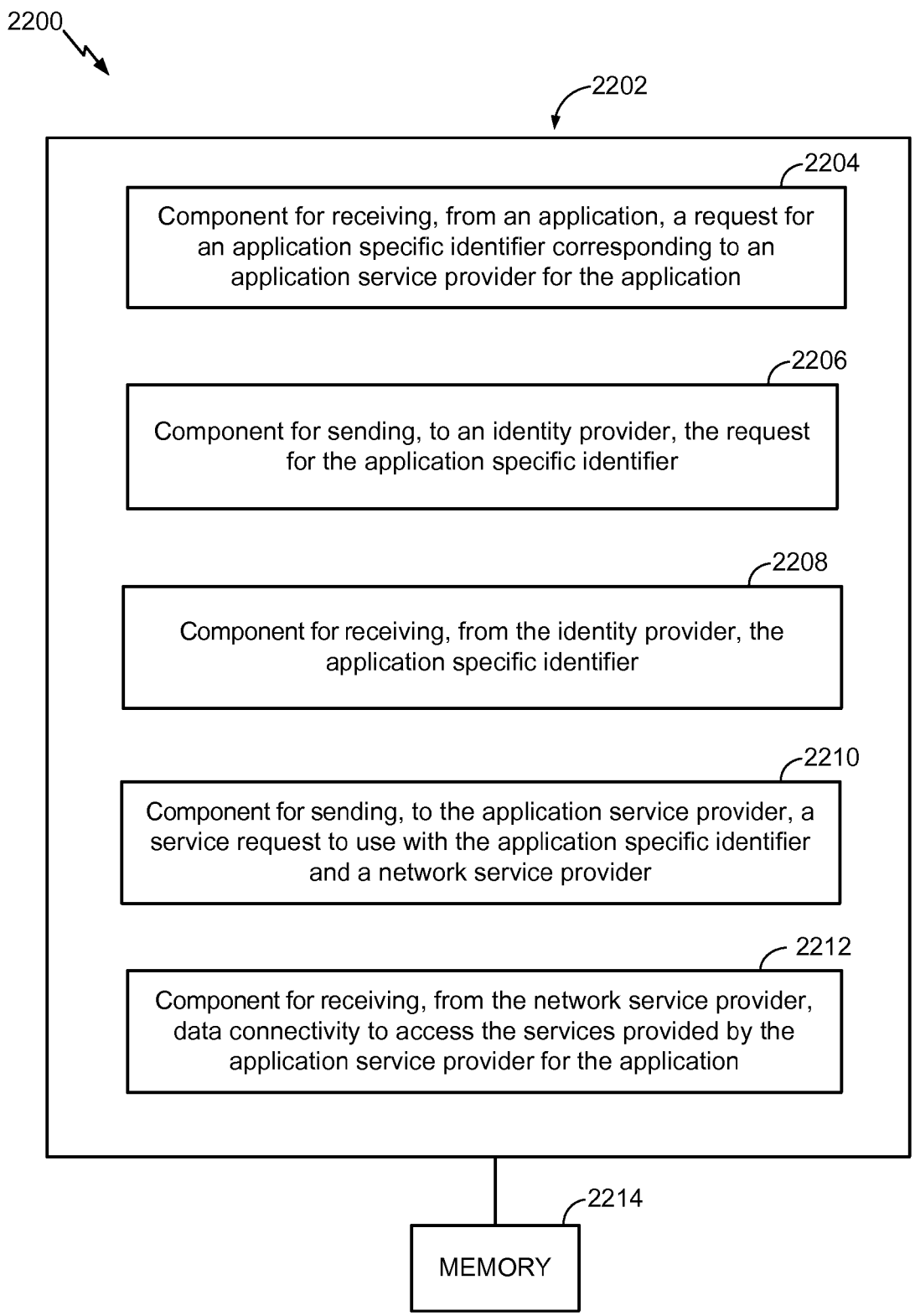
FIG. 22 is an example system that facilitates communication in accordance with an aspect.

Referring now to FIG. 22, illustrated is a system 2200 configured for communication. For example, system 2200 can reside at least partially within a transmitter, mobile device, etc. It is to be appreciated that system 2200 is represented as including functional blocks, which can be functional blocks that represent functions implemented by a processor, software, or combination thereof (e.g., firmware). System 2200 includes a logical grouping 2202 of electrical components that facilitate communication. For instance, logical grouping 2202 may include component 2204 for receiving, from an application, a request for an application specific identifier corresponding to an application service provider for the application. Further, logical grouping 2202 may comprise component 2206 for sending, to an identity provider, the request for the application specific identifier. In addition, logical grouping 2202 may include component 2208 for receiving, from the identity provider, the application specific identifier. Logical grouping 2202 may also include component 2210 for sending, to the application service provider, a service request to use with the application specific identifier and a network service provider. Moreover, logical grouping 2202 may comprise component 2212 for receiving, from the network service provider, data connectivity to access the services provided by the application service provider for the application. Additionally, system 2200 can include a memory 2214 that retains instructions for executing functions associated with electrical components 2204, 2206, 2208, 2210, and 2212. While shown as being external to memory 2214, it is to be understood that one or more of electrical components 2204, 2206, 2208, 2210, and 2212 can exist within memory 2214.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of communication, comprising:
   receiving, from an identifier (ID) client on a wireless device, a request for an application specific identifier corresponding to an application service provider;
   generating, at an identity provider, the application specific identifier;
   mapping, at the identity provider, the application specific identifier to a device identifier of the wireless device, wherein the device identifier of the wireless device provides a basis for application service authorization and access for a plurality of application service providers;
   sending, from the identity provider, the application specific identifier to the wireless device;
   receiving, at the identity provider, a request to activate connectivity for the application specific identifier from the application service provider that sent the request to activate in response to receiving a request for service from the wireless device;
   performing, at the identity provider, a lookup for the device identifier based on the received application specific identifier in the request to activate; and
   sending, from the identity provider a connectivity request with the device identifier from the lookup to a network service provider to provide the connectivity to the wireless device, wherein the identity provider enables communication of the wireless device with the network service provider based at least in part on verification of the device identifier by the identity provider.

2. The method of claim 1, wherein the request to activate connectivity further comprises a data connectivity plan for the wireless device.

3. The method of claim 1, wherein the request to activate connectivity further comprises information identifying a data connectivity plan for the wireless device.

4. The method of claim 1, further comprising:
   performing an authentication of the wireless device with a subscriber identity module of the wireless device.

5. The method of claim 1, further comprising:
receiving, from the identifier client on the wireless device, a request for a network specific identifier corresponding to the network service provider;
generating the network specific identifier;
mapping the network specific identifier to the device identifier of the wireless device; and
sending the network specific identifier to the wireless device.

6. The method of claim 1, wherein receiving the request to activate connectivity for the application specific identifier from the application service provider further comprises network service provider information.

7. The method of claim 6, wherein performing the lookup for the device identifier further comprises performing a lookup for the network specific identifier based upon the network service provider information.

8. The method of claim 1, wherein the connectivity request further includes the network specific identifier.

9. An apparatus for wireless communication, the apparatus comprising:
a processor;
a memory in communication with the processor, wherein the memory includes instructions executable by the processor to:
receive, from an identifier (ID) client on a wireless device, a request for an application specific identifier corresponding to an application service provider;
generate the application specific identifier;
map the application specific identifier to a device identifier of the wireless device, wherein the device identifier of the wireless device provides a basis for application service authorization and access for a plurality of application service providers;
send the application specific identifier to the wireless device;
receive a request to activate connectivity for the application specific identifier from the application service provider that sent the request to activate in response to receiving a request for service from the wireless device;
perform a lookup for the device identifier based on the received application specific identifier in the request to activate; and
send a connectivity request with the device identifier from the lookup to a network service provider to provide the connectivity to the wireless device, wherein the apparatus enables communication of the wireless device with the network service provider based at least in part on verification of the device identifier by the apparatus.

10. The apparatus of claim 9, wherein the request to activate connectivity further comprises a data connectivity plan for the wireless device.

11. The apparatus of claim 9, wherein the request to activate connectivity further comprises information identifying a data connectivity plan for the wireless device.

12. The apparatus of claim 9, wherein the instructions are further executable by the processor to:
perform an authentication of the wireless device with a subscriber identity module of the wireless device.

13. The apparatus of claim 9, wherein the instructions are further executable by the processor to:
receive, from the identifier client on the wireless device, a request for a network specific identifier corresponding to the network service provider;
generate the network specific identifier;
map the network specific identifier to the device identifier of the wireless device; and
send the network specific identifier to the wireless device.

14. The apparatus of claim 13, wherein the instructions executable by the processor to receive the request to activate connectivity for the application specific identifier from the application service provider further comprises network service provider information.

15. The apparatus of claim 14, wherein performing the lookup for the device identifier further comprises performing a lookup for the network specific identifier based upon the network service provider information.

16. The apparatus of claim 9, wherein the connectivity request further includes the network specific identifier.

17. An apparatus for wireless communication, comprising:
means for receiving, from an identifier (ID) client on a wireless device, a request for an application specific identifier corresponding to an application service provider;
means for generating the application specific identifier;
means for mapping the application specific identifier to a device identifier of the wireless device, wherein the device identifier of the wireless device provides a basis for application service authorization and access for a plurality of application service providers;
means for sending the application specific identifier to the wireless device;
means for receiving a request to activate connectivity for the application specific identifier from the application service provider that sent the request to activate in response to receiving a request for service from the wireless device;
means for performing a lookup for the device identifier based on the received application specific identifier in the request to activate; and
means for sending a connectivity request with the device identifier from the lookup to a network service provider to provide the connectivity to the wireless device, wherein the apparatus enables communication of the wireless device with the network service provider based at least in part on verification of the device identifier by the apparatus.

18. The apparatus of claim 17, wherein the request to activate connectivity further comprises a data connectivity plan for the wireless device.

19. The apparatus of claim 17, wherein the request to activate connectivity further comprises information identifying a data connectivity plan for the wireless device.

20. The apparatus of claim 17, wherein the instructions are further executable by the processor to:
perform an authentication of the wireless device with a subscriber identity module of the wireless device.

21. The apparatus of claim 17, further comprising:
means for receiving, from the identifier client on the wireless device, a request for a network specific identifier corresponding to the network service provider;
means for generating the network specific identifier;
means for mapping the network specific identifier to the device identifier of the wireless device; and
means for sending the network specific identifier to the wireless device.

22. The apparatus of claim 17, wherein the means for receiving the request to activate connectivity for the application specific identifier from the application service provider further comprises network service provider information.

23. The apparatus of claim 22, wherein means for performing the lookup for the device identifier further comprises means for performing a lookup for the network specific identifier based upon the network service provider information.

24. The apparatus of claim 17, wherein the connectivity request further includes the network specific identifier.

25. A non-transitory computer readable medium comprising code for:
  receiving, from an identifier (ID) client on a wireless device, a request for an application specific identifier corresponding to an application service provider;
  generating the application specific identifier;
  mapping the application specific identifier to a device identifier of the wireless device, wherein the device identifier of the wireless device provides a basis for application service authorization and access for a plurality of application service providers;
  sending the application specific identifier to the wireless device;
  receiving a request to activate connectivity for the application specific identifier from the application service provider that sent the request to activate in response to receiving a request for service from the wireless device;
  performing a lookup for the device identifier based on the received application specific identifier in the request to activate; and
  sending a connectivity request with the device identifier from the lookup to a network service provider to provide the connectivity to the wireless device, wherein communication of the wireless device with the network service provider is enabled based at least in part on verification of the device identifier.

26. The computer readable medium of claim 25, wherein the request to activate connectivity further comprises a data connectivity plan for the wireless device.

27. The computer readable medium of claim 25, wherein the request to activate connectivity further comprises information identifying a data connectivity plan for the wireless device.

28. The computer readable medium of claim 25, further comprising code for:
  performing an authentication of the wireless device with a subscriber identity module of the wireless device.

29. The computer readable medium of claim 25, further comprising code for:
  receiving, from the identifier client on the wireless device, a request for a network specific identifier corresponding to the network service provider;
  generating the network specific identifier;
  mapping the network specific identifier to the device identifier of the wireless device; and
  sending the network specific identifier to the wireless device.

30. The computer readable medium of claim 25, wherein the code for receiving the request to activate connectivity for the application specific identifier from the application service provider further comprises network service provider information.

* * * * *